US012671584B2

(12) United States Patent
Moyer et al.

(10) Patent No.: US 12,671,584 B2
(45) Date of Patent: Jun. 30, 2026

(54) GENERATING DEEP-LINKED STOCHASTIC IMAGES

(71) Applicant: Capital One Services, LLC, McLean, VA (US)

(72) Inventors: Maximo Moyer, Berwyn, PA (US); Dwipam Katariya, McLean, VA (US); Dan Quach, McLean, VA (US); Joshua Edwards, Philadelphia, PA (US); Michael Mossoba, Great Falls, VA (US); Tyler Maiman, Melville, NY (US); Benjamin Eng, Silver Spring, MD (US); Youbing Yin, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 185 days.

(21) Appl. No.: 18/506,834

(22) Filed: Nov. 10, 2023

(65) Prior Publication Data

US 2025/0158821 A1 May 15, 2025

(51) Int. Cl.
*H04L 9/32* (2006.01)
*G06T 11/00* (2006.01)

(52) U.S. Cl.
CPC ............ *H04L 9/3213* (2013.01); *G06T 11/00* (2013.01)

(58) Field of Classification Search
CPC ............................... H04L 9/3213; G06T 11/00
See application file for complete search history.

(56) References Cited

U.S. PATENT DOCUMENTS

| | | | |
|---|---|---|---|
| 2023/0084897 A1* | 3/2023 | Ryoo ................... | G06Q 20/382 |
| | | | 705/44 |
| 2024/0129292 A1* | 4/2024 | Nyamwange .......... | H04N 23/20 |
| 2024/0296595 A1* | 9/2024 | Daha ...................... | H04L 9/3213 |
| 2024/0331235 A1* | 10/2024 | Smock ................... | G16C 20/70 |

* cited by examiner

*Primary Examiner* — Henry Tsang
(74) *Attorney, Agent, or Firm* — Foley & Lardner LLP

(57) ABSTRACT

Methods and systems are described herein for generating deep-linked stochastic image representations of access tokens that embed token access deep links on a mobile application interface. The system may obtain, in connection with a request to register an access token with an account, token data associated with the access token and event data associated with one or more events performed with the access token. The system may generate, for input to a stochastic machine learning model, input vectors using the token data and the event data. The system may obtain, via the stochastic machine learning model based on the input vectors, an image for the access token and may generate, for display on a user interface associated with the account, an image representation of the access token including the image and a deep link to functionality associated with the access token.

19 Claims, 10 Drawing Sheets

*800*

Obtain (i) token data associated with an access token and (ii) event data associated with one or more events performed with the access token
*802*

Generate, for input to a stochastic machine learning model, input vectors using the token data and the event data
*804*

Obtain, via a stochastic machine learning model, an image for the token based on the input vectors
*806*

Generate, for display, an image representation of the access token
*808*

100

204

ML Model 202

206

300

| Operation | Feature A | Feature B | Feature C |
|-----------|-----------|-----------|-----------|
| <operation_1> | <value_1a> | <value_1b> | <value_1c> |
| <operation_2> | <value_2a> | <value_2b> | <value_2c> |
| <operation_3> | <value_3a> | <value_3b> | <value_3c> |
| <operation_4> | <value_4a> | <value_4b> | <value_4c> |
| <operation_5> | <value_5a> | <value_5b> | <value_5c> |

| Image | Parameter A | Parameter B | Parameter C | Parameter D |
|---|---|---|---|---|
| 403 | 406 | 409 | 412 | 415 |
| *<image_1>* | *<value_A>* | *<value_B>* | *<value_C>* | *<value_D>* |
| *<image_2>* | *<value_A>* | *<value_B>* | *<value_C>* | *<value_D>* |

FIG. 4

500
525
550
575
FIG. 5

600

| Image | Operation | Feature A | Feature B | Feature C |
|---|---|---|---|---|
| <image_1> | <operation_1> | <value_1a> | <value_1b> | <value_1c> |
| <image_2> | <operation_2> | <value_2a> | <value_2b> | <value_2c> |
| <image_3> | <operation_3> | <value_3a> | <value_3b> | <value_3c> |
| <image_4> | <operation_4> | <value_4a> | <value_4b> | <value_4c> |
| <image_5> | <operation_5> | <value_5a> | <value_5b> | <value_5c> |

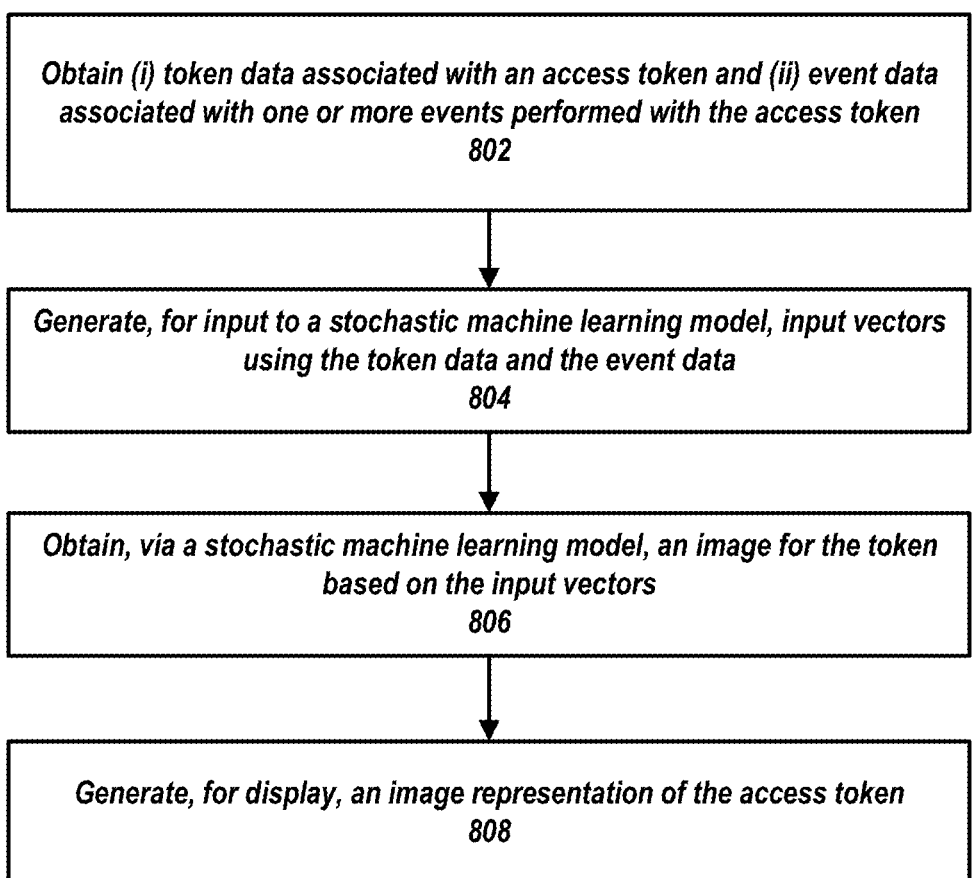

Obtain (i) token data associated with an access token and (ii) event data associated with one or more events performed with the access token
802

Generate, for input to a stochastic machine learning model, input vectors using the token data and the event data
804

Obtain, via a stochastic machine learning model, an image for the token based on the input vectors
806

Generate, for display, an image representation of the access token
808

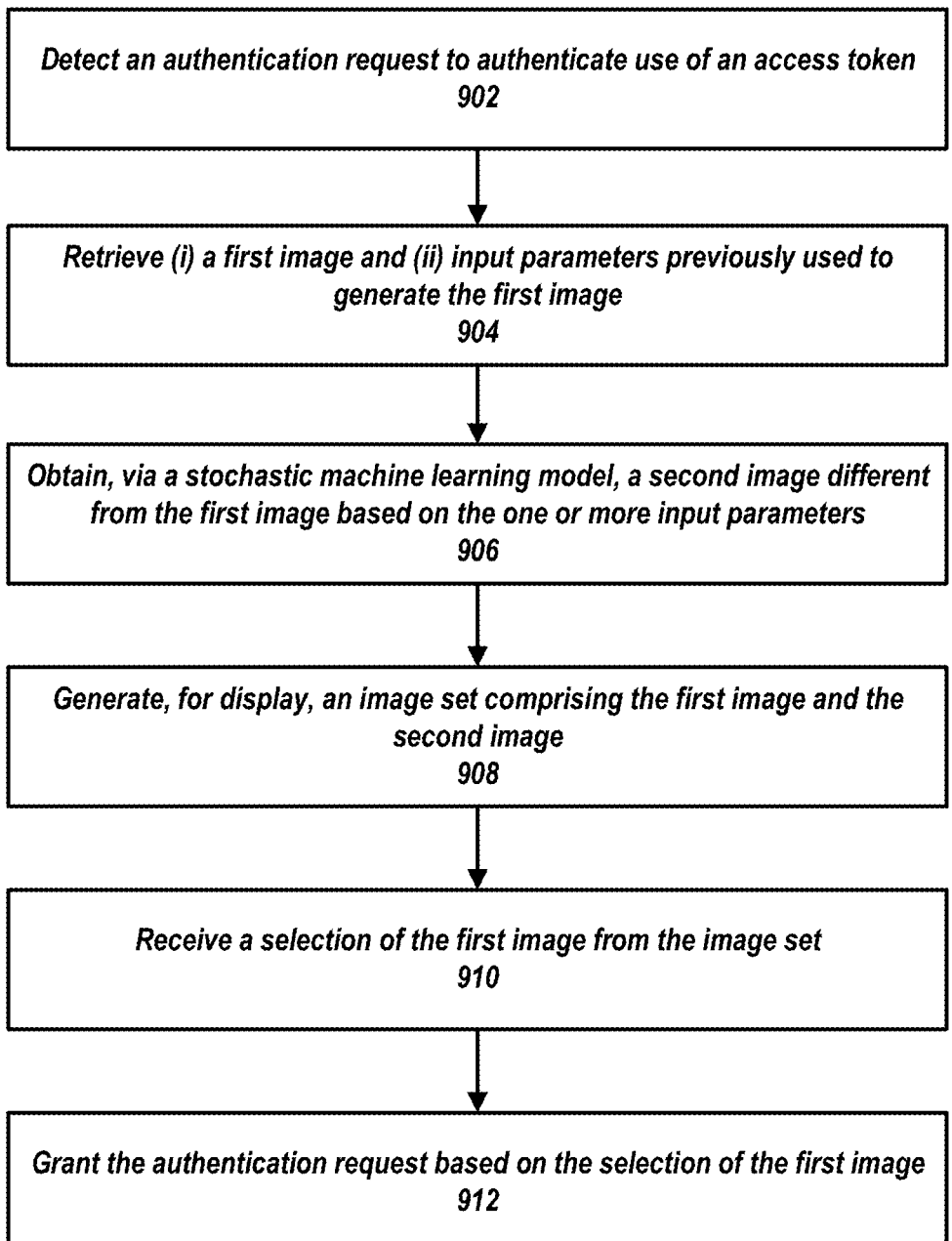

Detect an authentication request to authenticate use of an access token
902

Retrieve (i) a first image and (ii) input parameters previously used to generate the first image
904

Obtain, via a stochastic machine learning model, a second image different from the first image based on the one or more input parameters
906

Generate, for display, an image set comprising the first image and the second image
908

Receive a selection of the first image from the image set
910

Grant the authentication request based on the selection of the first image
912

GENERATING DEEP-LINKED STOCHASTIC IMAGES

BACKGROUND

Network access tokens enable performance of many secure operations within a network, such as transmitting tokens, accessing application functionality, and communicating securely. Use of network access tokens requires authentication to ensure that the use is authorized and devoid of malicious activity. Such authentication is crucial to the security of the network but is often difficult to perform adequately. For example, existing systems utilizing static methods to perform authentication are limited in their robustness to withstand organized or repeated attacks from malicious actors or bots.

SUMMARY

Methods and systems are described herein for utilizing model-generated images (e.g., stochastic images) for use of network access tokens or other tokens. As an example, the methods and systems facilitate secure use of tokens using images generated based on details related to a user's account. By doing so, the methods and systems may facilitate secure token registration, access, or authentication without necessarily requiring users to remember authentication credentials as well as ensure that unauthorized users are not able to access the account of a user if the unauthorized users learn the authorized user's credentials. However, the use of images belonging to the user to facilitate token use would create storage and privacy concerns. For example, in order to use images that belong to the user, the system must store those images, which increases the amount of data that the system must devote to storage. Additionally, the images that belong to the user may be personal, which may also raise privacy concerns.

To solve these technical problems, the methods and systems recite the use of artificial intelligence (AI) models to generate images based on details related to a user's account. A system may be built and configured to perform operations discussed herein. For example, the system may display stochastic images to the user in association with tokens registered with a mobile application. A stochastic image may be used to distinguish a particular token from others without requiring images that belong to the user. Improved distinguishability between tokens facilitates secure token use by decreasing a likelihood that the user will mistakenly transmit the wrong token for a particular operation. In some embodiments, the system may use the stochastic images for authentication of a user attempting to gain access to a token. As the stochastic images are generated based on details of the user's account, the user is able to identify the correct authentication images. In some embodiments, the system may use the stochastic images to enable a user to submit feedback relating to operation data associated with the stochastic images. After receiving feedback, the system no longer needs to store the stochastic images and can delete them-again saving data storage space and alleviating any privacy concerns. Furthermore, the patterns of stochastic machine learning models are more difficult to predict than the patterns of non-stochastic machine learning models. The use of stochastic models therefore makes it more difficult for malicious actors to replicate the stochastic images or predict which images are AI-generated images. Accordingly, the methods and systems overcome the aforementioned technical problems as well as provide an improved mechanism for facilitating secure use of network access tokens.

Some embodiments involve generating deep-linked stochastic image representations of access tokens. For example, an access token may be a unique and temporary authorization credential that is used to grant access to specific resources or functionalities within a system or service. The system may obtain, based on a request related to a token associated with a user, token data associated with the token and event data associated with one or more events related to the token. For example, the event data may include records of access granted or denied using the token. The system may generate one or more token embeddings using the token data and the event data (e.g., low-dimensional-space representations of the token data and the event data that reduce the number of features to be processed by a machine learning model). The system may provide the token embeddings to a stochastic machine learning model to obtain an image for the token. The system may then generate, for display on a user interface associated with the user, an image representation of the token. For example, the image representation may be (i) a representation illustrative of an event performed by the token, (ii) a representation illustrative of the system with which the token is affiliated, or (iii) another representation. The image representation may be deep-linked to functionality, for example, for transmitting the token.

Some embodiments involve facilitating token use authentication for an access token using stochastic-model-derived images. The system may detect an authentication request to authenticate use of an access token. For example, a user may be attempting to gain access to a system using the access token. The access token may be associated with a first image previously displayed to an authenticated user of the access token. For example, the first image may have been displayed to the authenticated user in connection with a prior event, such as when the access token was previously used to grant access to a system. The system may retrieve, from storage, the first image previously displayed to the authenticated user and one or more input parameters previously used to generate the first image. The input parameters may correspond to token data associated with the access token and may have previously been input into a model to generate the first image. In some embodiments, the system may provide the input parameters to a stochastic machine learning model to obtain a second image different from the first image. The system may then generate, for display, an image set including the first image and the second image. The system may receive a selection of the first image from the image set (i.e., the image that was previously displayed to the authenticated user) and may grant the authentication request based on the selection of the first image.

Some embodiments involve generating deep-linked items related to stochastic images derived from operation data. Deep-linked items may include content, pages, or resources that can be directly accessed through a deep link. A deep link may include a URL or link that takes users directly to the content, pages, or resources, bypassing the app's or website's home page or main landing page. The system may receive event data associated with an event performed in connection with a token. For example, the event data may include records of access granted or denied using the token. The system may generate a token embedding based on the event data and may provide the token embedding to a stochastic machine learning model to obtain an image related to the event. The system may generate, for display, the image and the event data. For example, the image and event data may convey to a user the events, such as instances of granted or denied access using the token, along with image representations of those instances. In some embodiments, each image may be deep-linked to functionality for submitting feedback relating to the events. In some embodiments, the system may receive feedback related to the image indicating an invalid event. For example, the user may not recognize one of the instances. The system may then perform, based on the feedback related to the image, one or more remedial actions related to the token or to the event.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

BRIEF DESCRIPTION OF THE DRAWINGS

FIG. 3 illustrates a data structure storing operation data associated with network operations performed with a token, in accordance with one or more embodiments.

FIG. 4 illustrates a data structure storing image generation parameters for generating stochastic images, in accordance with one or more embodiments.

FIG. 5 illustrates sets of model-generated images, in accordance with one or more embodiments.

FIG. 6 illustrates a data structure storing images associated with network operations performed with a token, in accordance with one or more embodiments.

FIG. 8 shows a flowchart of the process for generating deep-linked stochastic image representations of access tokens, in accordance with one or more embodiments.

FIG. 9 shows a flowchart of the process for facilitating token use authentication for an access token using stochastic-model-derived images, in accordance with one or more embodiments.

DETAILED DESCRIPTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
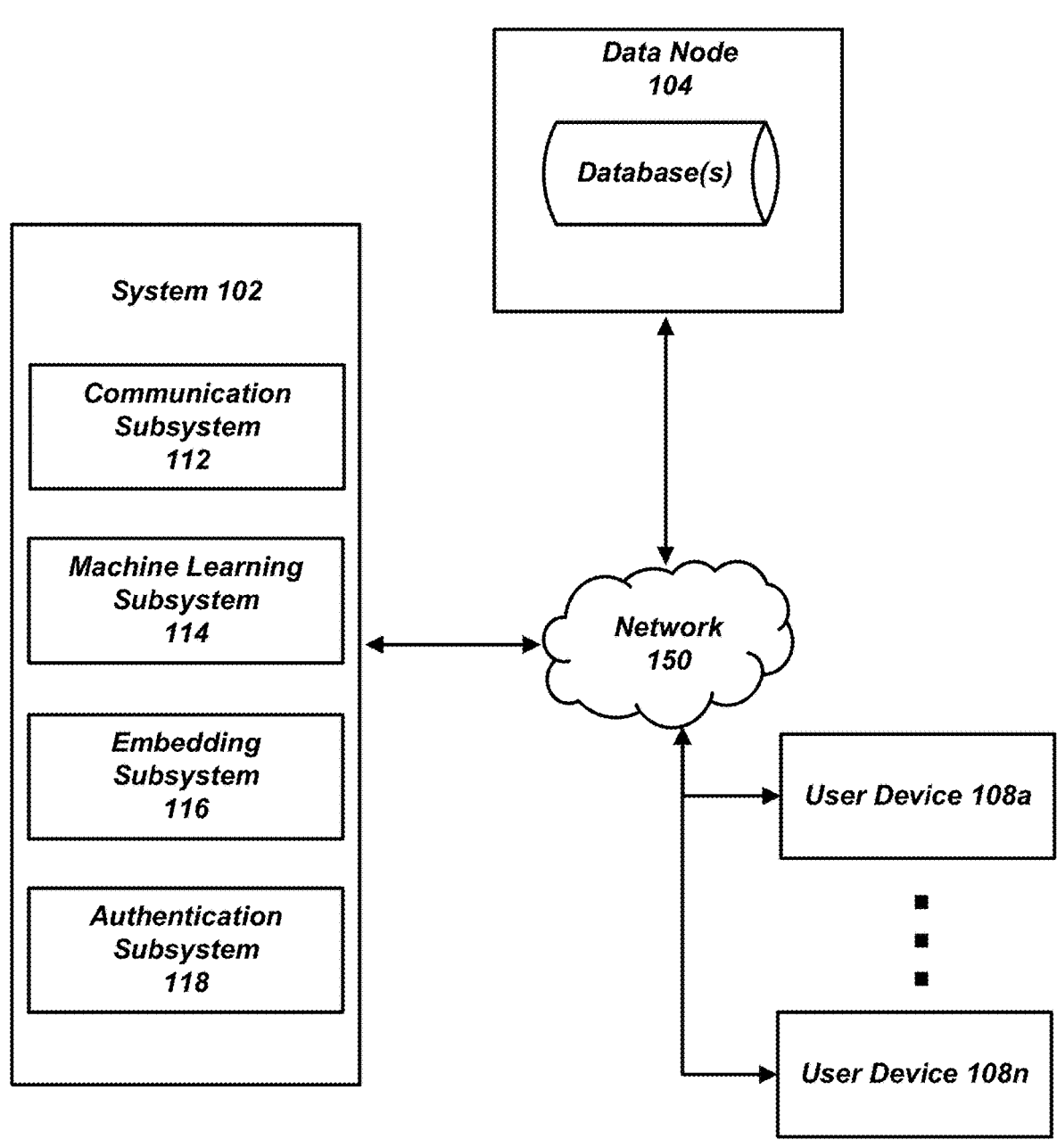
FIG. 1 shows an illustrative system for utilizing model-generated images for use of tokens, in accordance with one or more embodiments.

FIG. 1 shows an illustrative system 100 for utilizing model-generated images for use of tokens (e.g., web tokens, other access tokens, etc.), in accordance with one or more embodiments. In some embodiments, system 100 may generate one or more images based on data related to a token via one or more image generation models and use the images for verification/authentication purposes. The image generation models may include one or more stochastic machine learning models, other machine learning models, or other AI models. Such token-related data for the token may include (i) one or more token identifiers, (ii) event data related to use of the token in connection with one or more events, (iii) preferences or constraints associated with the token, or (iv) other data.

As an example, the token-related data (e.g., an embedding or other representation thereof) may be provided as input to a machine learning model to obtain the images (e.g., as output from the machine learning model), and the images may be used to (i) improve an authorized user's recognition of the token or use thereof (e.g., to enable the user to better distinguish the token from other tokens via a model-generated image for the token, to prevent inadvertent use of the wrong token by an authorized user, etc.), (ii) perform authentication for one or more events (e.g., prior to authorizing one or more network operations or other events), (iii) verify that one or more events are valid (e.g., one or more network operations were authorized by an authorized user of the token), or perform other features.

Some embodiments involve generating deep-linked stochastic image representations of access tokens (e.g., network access tokens or other access tokens). For example, an access token may be a unique and temporary authorization credential that is used to grant access to specific resources or functionalities within a system or service. System 100 (e.g., system 102) may obtain, based on a request related to a token associated with a user, token data associated with the token and event data associated with one or more events related to the token. For example, the event data may include records of access or registration granted or denied using the token. System 102 may generate one or more token embeddings using the token data and the event data. The token embeddings may compile the token and event data for processing by a machine learning model. System 102 may provide the token embeddings to a stochastic machine learning model to obtain an image for the token. System 102 may then generate, for display on a user interface associated with the user, an image representation of the token. In some embodiments, the image representation may be deep-linked to application functionality for transmitting the token. For example, the image representation may be illustrative of an event performed by the token, the system with which the token is affiliated, or another representation. In some embodiments, the image representation of the token may be displayed in connection with use of the token for at least one event. For example, the image representation may be displayed in connection with a future event in which access is either granted or denied using the token.

Some embodiments involve facilitating token use authentication for an access token (e.g., network access tokens or other access tokens) using stochastic-model-derived images. System 102 may detect an authentication request to authenticate use of an access token. For example, a user may be attempting to gain access to a system using the access token. The access token may be associated with a first image previously displayed to an authenticated user of the access token. For example, the first image may have been displayed to the authenticated user in connection with a prior event, such as when the access token was previously used to grant access to a system. System 102 may retrieve, from storage, the first image previously displayed to the authenticated user and one or more input parameters previously used to generate the first image. The input parameters may correspond to token data associated with the access token and may have previously been input into a model to generate the first image. In some embodiments, system 102 may provide the input parameters to a stochastic machine learning model to obtain a second image different from the first image. System 102 may then generate, for display, an image set including the first image and the second image. System 102 may receive a selection of the first image from the image set and may grant the authentication request based on the selection of the first image.

Some embodiments involve generating deep-linked items related to stochastic images derived from operation data. Deep-linked items may include content, pages, or resources that can be directly accessed through a deep link. A deep link may include a URL or link that takes users directly to the content, pages, or resources, bypassing the app's or website's home page or main landing page. System 102 may receive event data associated with an event performed in connection with a token. For example, the event data may include records of access granted or denied using the token. System 102 may generate a token embedding based on the event data and may provide the token embedding to a stochastic machine learning model to obtain an image related to the event. System 102 may generate, for display, the image and the event data. For example, the image and event data may convey to a user the events, such as instances of granted or denied access using the token, along with image representations of those instances. In some embodiments, system 102 may receive feedback related to the image indicating an invalid event. For example, the user may not recognize one of the instances. System 102 may then perform, based on the feedback related to the image, one or more remedial actions related to the token or to the event.

These processes may be used individually or in conjunction with each other and with any other processes for facilitating utilization of stochastic images for use of tokens.

As shown in FIG. 1, system 100 may include system 102, data node 104, and user devices 108a-108n. System 102 may include communication subsystem 112, machine learning subsystem 114, embedding subsystem 116, authentication subsystem 118, and/or other subsystems. In some embodiments, only one user device may be used, while in other embodiments, multiple user devices may be used. The user devices 108a-108n may be associated with one or more users. The user devices 108a-108n may be associated with one or more user accounts. In some embodiments, user devices 108a-108n may be computing devices that may receive and send data via network 150. User devices 108a-108n may be end-user computing devices (e.g., desktop computers, laptops, electronic tablets, smartphones, and/or other computing devices used by end users). User devices 108a-108n may output (e.g., via a graphical user interface) run applications, output communications, visuals, or images, receive inputs, or perform other actions.

In some embodiments, system 102 may execute instructions for utilizing stochastic images for use of tokens. System 102 may include software, hardware, or a combination of the two. For example, communication subsystem 112 may include a network card (e.g., a wireless network card and/or a wired network card) that is associated with software to drive the card. In some embodiments, system 102 may be a physical server or a virtual server that is running on a physical computer system. In some embodiments, system 102 may be configured on a user device (e.g., a laptop computer, a smart phone, a desktop computer, an electronic tablet, or another suitable user device).

Data node 104 may store various data, including one or more machine learning models, training data, communications, images, and/or other suitable data. In some embodiments, data node 104 may also be used to train machine learning models. Data node 104 may include software, hardware, or a combination of the two. For example, data node 104 may be a physical server, or a virtual server that is running on a physical computer system. In some embodiments, system 102 and data node 104 may reside on the same hardware and/or the same virtual server/computing device. Network 150 may be a local area network, a wide area network (e.g., the Internet), or a combination of the two.

System 102 (e.g., machine learning subsystem 114) may include one or more machine learning models. For example, one or more machine learning models may be trained to generate images based on inputs. The machine learning models may include one or more stochastic machine learning models. Machine learning subsystem 114 may include software components, hardware components, or a combination of both. For example, machine learning subsystem 114 may include software components (e.g., API calls) that access one or more machine learning models. Machine learning subsystem 114 may access training data, for example, in memory. In some embodiments, machine learning subsystem 114 may access the training data on data node 104 or on user devices 108a-108n. In some embodiments, the training data may include entries with corresponding features and corresponding output labels for the entries. In some embodiments, machine learning subsystem 114 may access one or more machine learning models. For example, machine learning subsystem 114 may access the machine learning models on data node 104 or on user devices 108a-108n. In some embodiments, one or more machine learning models may be trained to generate stochastic images for use of tokens.

In some embodiments, machine learning subsystem 114 may include one or more stochastic machine learning models. A stochastic machine learning model may incorporate randomness or probabilistic elements into its architecture or learning process. Randomness may allow for the modeling of uncertainty and the generation of varied outputs rather than producing deterministic predictions or results. In some embodiments, the stochastic machine learning models may be trained using adversarial techniques. For example, communication subsystem 112 may retrieve a large dataset of real images for model training. The stochastic machine learning model may include a generator network and a discriminator network. The generator network may receive random noise or input vectors as input and attempt to generate realistic images. The discriminator network may be trained to distinguish between real images from the dataset and stochastic images produced by the generator. The generator and discriminator networks may iteratively work against each other, where the generator attempts to generate images that the discriminator cannot classify as either real or synthetic while the discriminator attempts to accurately classify real and synthetic images. The model's parameters may be updated based on the loss function computed during backpropagation, thus optimizing the generator and discriminator networks.

In some embodiments, machine learning subsystem 114 may utilize the adversarial network to generate the stochastic images. For example, machine learning subsystem 114 may obtain a first iteration of a stochastic image from a generator of the stochastic machine learning model. For example, the generator of the stochastic machine learning model may generate the first iteration based on first generation parameters, event data, or other inputs. In some embodiments, machine learning subsystem 114 may refrain from outputting an image generated by the generator of the adversarial network unless a classifier is unable to classify the generated image as synthetic (as opposed to real) or until the classifier classifies the generated image as real. In some embodiments, the generator may continue generating iterations of a stochastic image until the classifier classifies the generated image as real (e.g., as opposed to synthetic).

Figure 2:
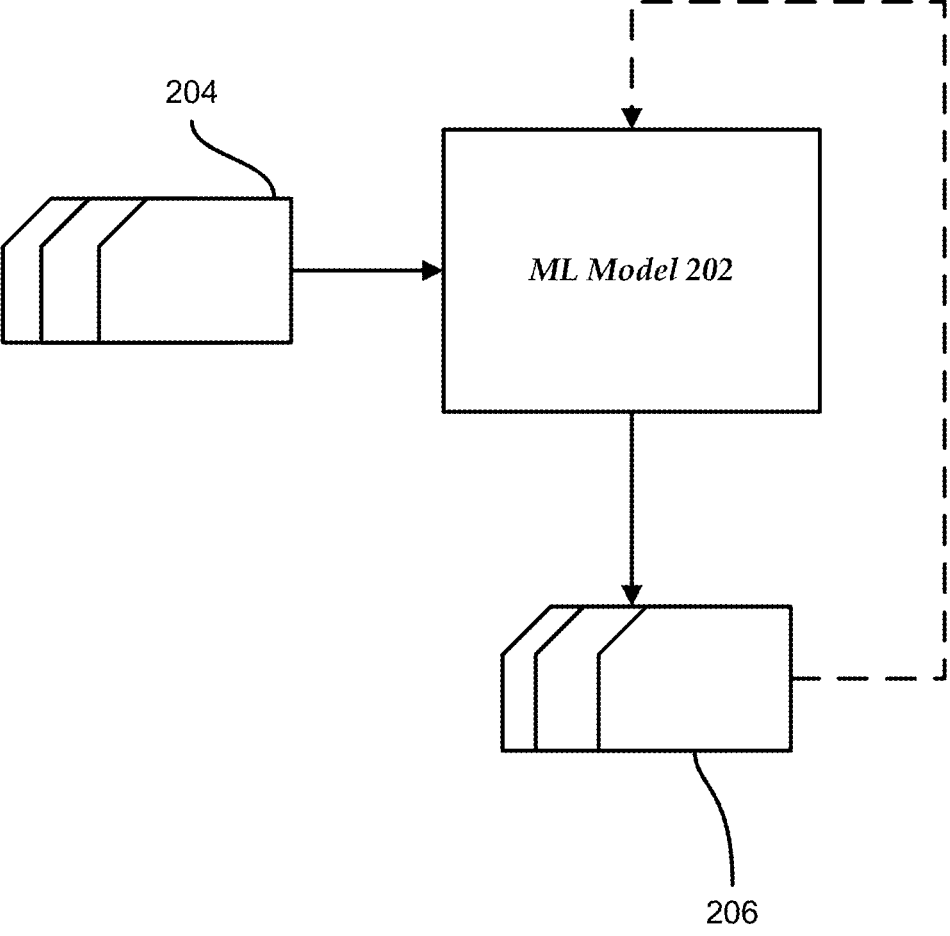
FIG. 2 illustrates an exemplary machine learning model, in accordance with one or more embodiments.

FIG. 2 illustrates an exemplary machine learning model 202, in accordance with one or more embodiments. The machine learning model may have been trained using features associated with token operations, such as timestamps, locations, source information, or other features associated with network operations. In some embodiments, the machine learning model may take as inputs image generation parameters, such as constraints for generated images or other parameters. The machine learning model may have been trained to generate stochastic images based on the inputs. In some embodiments, machine learning model 202 may be included in machine learning subsystem 114 or may be associated with machine learning subsystem 114. Machine learning model 202 may take input 204 (e.g., event data or operation data, as discussed in greater detail in relation to FIG. 3, image generation parameters, as discussed in greater detail in relation to FIG. 4, or other inputs) and may generate outputs 206 (e.g., stochastic images, as described in greater detail with respect to FIG. 6). The output parameters may be fed back to the machine learning model as input to train the machine learning model (e.g., alone or in conjunction with user indications of the accuracy of outputs, labels associated with the inputs, or other reference feedback information). The machine learning model may update its configurations (e.g., weights, biases, or other parameters) based on the assessment of its prediction (e.g., of an information source) and reference feedback information (e.g., user indication of accuracy, reference labels, or other information). Connection weights may be adjusted, for example, if the machine learning model is a neural network, to reconcile differences between the neural network's prediction and the reference feedback. One or more neurons of the neural network may require that their respective errors be sent backward through the neural network to facilitate the update process (e.g., backpropagation of error). Updates to the connection weights may, for example, be reflective of the magnitude of error propagated backward after a forward pass has been completed. In this way, for example, the machine learning model may be trained to generate better predictions of information sources that are responsive to a query.

In some embodiments, the machine learning model may include an artificial neural network. In such embodiments, the machine learning model may include an input layer and one or more hidden layers. Each neural unit of the machine learning model may be connected to one or more other neural units of the machine learning model. Such connections may be enforcing or inhibitory in their effect on the activation state of connected neural units. Each individual neural unit may have a summation function, which combines the values of all of its inputs together. Each connection (or the neural unit itself) may have a threshold function that a signal must surpass before it propagates to other neural units. The machine learning model may be self-learning and/or trained, rather than explicitly programmed, and may perform significantly better in certain areas of problem solving, as compared to computer programs that do not use machine learning. During training, an output layer of the machine learning model may correspond to a classification of machine learning model, and an input known to correspond to that classification may be input into an input layer of the machine learning model during training. During testing, an input without a known classification may be input into the input layer, and a determined classification may be output.

A machine learning model may include embedding layers in which each feature of a vector is converted into a dense vector representation. These dense vector representations for each feature may be pooled at one or more subsequent layers to convert the set of embedding vectors into a single vector.

The machine learning model may be structured as a factorization machine model. The machine learning model may be a non-linear model and/or a supervised learning model that can perform classification and/or regression. For example, the machine learning model may be a general-purpose supervised learning algorithm that the system uses for both classification and regression tasks. Alternatively, the machine learning model may include a Bayesian model configured to perform variational inference on the graph and/or vector.

Components of FIGS. 1 and 2 may facilitate utilization of stochastic images for tokens, in accordance with embodiments discussed herein. For example, system 100 may facilitate generation of deep-linked stochastic image representations of access tokens using stochastic images generated by a stochastic machine learning model (e.g., machine learning model 202). System 100 may further facilitate token use authentication for an access token using stochastic-model-derived images generated by a stochastic machine learning model (e.g., machine learning model 202). System 100 may further facilitate generation of deep-linked items related to stochastic images derived from operation data, where the stochastic images are generated by a stochastic machine learning model (e.g., machine learning model 202).

Generating Linked Stochastic Images

In some embodiments, system 100 may facilitate generation of linked stochastic image representations of access tokens (e.g., deep-linked images, hyperlinked images, etc.).

Some embodiments involve generating deep-linked stochastic image representations of access tokens. For example, an access token may be a unique and temporary authorization credential that is used to grant access to specific resources or functionalities within a system or service. Communication subsystem 112 may obtain, based on a request related to a token associated with a user, token data associated with the token and event data associated with one or more events related to the token. For example, the event data may include records of access or registration granted or denied using the token. Embedding subsystem 116 may generate one or more token embeddings using the token data and the event data. The token embeddings may compile the token and event data for processing by a machine learning model. Machine learning subsystem 114 may provide the token embeddings to a stochastic machine learning model to obtain an image for the token. Communication subsystem 112 may then generate, for display on a user interface associated with the user, an image representation of the token. In some embodiments, the image representation may be deep-linked to application functionality for transmitting the token. For example, the image representation may be illustrative of an event performed by the token, the system with which the token is affiliated, or another representation. The image representation may thus improve an authorized user's recognition of the token or use thereof (e.g., to enable the user to better distinguish the token from other tokens via a model-generated image for the token or to prevent inadvertent use of the wrong token by an authorized user). In some embodiments, the image representation of the token may be displayed in connection with use of the token for at least one event. For example, the image representation may be displayed in connection with a future event in which access is either granted or denied using the token.

System 102 (e.g., communication subsystem 112) may receive a registration request to register a token with a mobile application. A token may be a security credential used to authenticate and authorize access to network resources or services. In some embodiments, the token may be affiliated with, received by, sent by, or otherwise associated with the account. The token may be issued to an application or user by system 102. In some embodiments, a token may include a credit card number, a virtual card number (VCN), or other identifier.

In some embodiments, the request to register the token with the mobile application may include a request to securely associate the access token with the mobile application, allowing the application to access specific resources or functionalities on behalf of the user or the application itself. In some embodiments, the registration request may include a token identifier associated with the token. The token identifier may be a unique identifier associated with the token. The token identifier may distinguish and reference a particular access token within a system. In some embodiments, the access token may be represented as strings of characters. In some embodiments, the authentication request may originate from a particular source, and the authentication request may include data about the source. In some embodiments, the registration request may include or be performed in response to the creation or binding of a card number or VCN to, for example, a merchant, merchant category, product category, geographic location, URL domain, or other entity.

In response to receiving the registration request, communication subsystem 112 may retrieve operation data or event data associated with network operations performed with the token. For example, communication subsystem 112 may retrieve the operation data using the token identifier. The operation data may include records of access granted or declined, including details of each occurrence of granted or declined access. The operation data may include records of registration requests that have been granted or declined, including details of each occurrence of granted or declined registration. System 102 may then generate one or more token embeddings using the token data and the event data. In some embodiments, the token data may include account data, user profile data, card number, card verification value (CVV), expiration date, age of account, or other data associated with the token. The token embeddings may compile the token and event data for processing by a machine learning model. System 102 may provide the token embeddings to a stochastic machine learning model to obtain an image for the token. System 102 may then generate, for display on a user interface associated with the user, an image representation of the token. In some embodiments, the image representation may be deep-linked to application functionality for transmitting the token.

FIG. 3 illustrates a data structure 300 storing operation data associated with network operations performed with a token, in accordance with one or more embodiments. In some embodiments, data structure 300 may be a subset of a larger data structure. Data structure 300 may include operations 303 and data relating to operations 303. For example, the data may include a first feature 306, a second feature 309, a third feature 312, or other information for each operation. In some embodiments, the features may include location, time, or other data associated with operations 303. In some embodiments, data structure 300 may include operations 303 that have been performed using the token. In some embodiments, data structure 300 may include operations 303 that have been performed by authentication subsystem 118 using multiple tokens including the token. In some embodiments, operations 303 may include records of granted access, declined access, or both granted and declined access. In some embodiments, operations 303 may include records of granted registration, declined registration, or both granted and declined registration. In some embodiments, operations 303 may include transactions performed in association with an account. For example, operations 303 may include transactions performed by using the token as a payment method or payment account. In some embodiments, operations 303 may include other types of token operations.

Returning to FIG. 1, system 102 (e.g., embedding subsystem 116) may use the token data obtained by communication subsystem 112 to generate, for input to a stochastic machine learning model, a token embedding or input vector. The token embedding or input vector may be a numerical representation of a token for input into a machine learning model. The process of generating token embeddings may involve mapping each token to a numerical vector in an embedding space. For example, an embedding space may be a mathematical representation of data in the form of numerical vectors, where similar data points are close together and dissimilar data points are farther apart. In some embodiments, embedding subsystem 116 may generate the token embeddings using (i) the token identifier associated with the token and (ii) the operation data associated with the network operations performed with the token. System 102 may use the token embeddings to generate image representations of the tokens, which may then be displayed on a mobile application in response to registration of the token with the mobile application.

As an example, to generate the token embeddings or input vectors, communication subsystem 112 may determine a subset of the events performed with the access token or to be performed with the access token. For example, the subset of the events may relate to a first category (e.g., coffee). Communication subsystem 112 may then determine aggregated resources associated with the subset of the events within a time frame. For example, communication subsystem 112 may determine the user's spending at coffee retailers within the past week. Communication subsystem 112 may retrieve, from the request to register the access token with the account, the token identifier associated with the access token. Using the token identifier, communication subsystem 112 may retrieve one or more preferences from the account, for example, preferences relating to the first category. In some embodiments, the category may be a spending category (e.g., groceries, retail, gas, etc.), the category may be more specific, the category may be user-defined, or there may be a different category. As an example, a user may prefer to receive updates regarding weekly coffee spending when the total spending within a previous sevenday period exceeds the user's budget (e.g., $50). In some embodiments, a user may prefer to receive updates for every $10 spent over the course of a month. In some embodiments, a user may have other preferences. Communication subsystem 112 may then generate the input vectors or token embeddings using the token data, the event data, the aggregated resources, and the preferences. For example, communication subsystem 112 may incorporate the preferences and the data relating to a subset of the events (e.g., coffee-related transactions) into the token embeddings. In some embodiments, the preferences may be aesthetic (e.g., a preferred color, color scheme, or theme). In some embodiments, the preferences may include other specifications.

In some embodiments, embedding subsystem 116 may incorporate other data into the token embeddings. For example, communication subsystem 112 may determine one or more external criteria, such as reward programs, offers, coupons, partnerships, incentives, or other relevant information associated with the user's account. For example, communication subsystem 112 may determine that there is a reward program for which the user will be eligible once the user's spending in a certain category reaches a threshold amount. Embedding subsystem 116 may thus incorporate spending in that certain category into an input vector for input into a stochastic machine learning model. In some embodiments, communication subsystem 112 may determine that an operation in the operation data corresponds to a partnership tied to the user's account. For example, an operation may indicate an upcoming flight, and embedding subsystem 116 may thus incorporate information about a rideshare service partnership available to the user into an input vector. In some embodiments, embedding subsystem 116 may incorporate details of the user's account data such as a payment due date into an input vector. In some embodiments, embedding subsystem 116 may incorporate account updates such as an increased credit limit into an input vector. In some embodiments, embedding subsystem 116 may incorporate a combination of these or other examples into one or more input vectors.

In some embodiments, communication subsystem 112 may retrieve, from an external database, source data relating to one or more sources of the operations. For example, a source may be a browser, a device, an application programming interface (API) client, or other source. The source may be identified based on an identifier (e.g., an IP address, a user identifier, an application identifier, a digital certificate, or other identifier) stored in a database (e.g., data structure 300) or elsewhere. In some embodiments, a source may be a merchant or retailer. In some embodiments communication subsystem 112 may request, from the source, an identifier or other data associated with the source. Communication subsystem 112 may retrieve source data associated with the identified source using the source identifier. Communication subsystem 112 may then generate the input vectors or token embeddings using the token data, the event data, and the source data. For example, communication subsystem 112 may include, in a token embedding, data about the source of one or more operations associated with the token. For example, the source may be a coffee retailer. Communication subsystem 112 may thus include data about the source in the token embedding. In some embodiments, this may cause the stochastic machine learning model to generate a stochastic image that incorporates the source.

In some embodiments, machine learning subsystem 114 may provide the token embedding to the stochastic machine learning model to obtain a stochastic image for the token. In some embodiments, machine learning subsystem 114 may obtain, via the stochastic machine learning model, one or more stochastic images based on a token embedding. For example, the stochastic machine learning model may be trained to generate stochastic images based on token embeddings or input vectors. In some embodiments, the stochastic machine learning model may be trained to generate stochastic images based on token embeddings or input vectors that have been processed using one or more processing techniques. In some embodiments, the stochastic machine learning model may be trained to generate stochastic images based on other data. In some embodiments, the stochastic machine learning model may be machine learning model 202, as shown in FIG. 2. In some embodiments, the stochastic machine learning model may output one or more stochastic images, as discussed above in relation to FIG. 2. Communication subsystem 112 may then generate, for display, the stochastic images or image representations based on the stochastic images that are deep-linked to application functionality for transmitting the token. The user may interact with the deep-linked image to facilitate transmitting the token.

In some embodiments, machine learning subsystem 114 may place one or more constraints on the outputs from the stochastic machine learning model. To do so, communication subsystem 112 may retrieve, from the request to register the access token with the account, a token identifier associated with the access token. Machine learning subsystem 114 may determine, using the token identifier, one or more constraints for outputs from the stochastic machine learning model. For example, machine learning subsystem 114 may determine the constraints based on the token embeddings or input vectors. As discussed above, the token embeddings or input vectors may include information relating to user preferences, one or more sources of operations, or other information. In some embodiments, machine learning subsystem 114 may retrieve, using the token identifier, one or more preferences directly from the account. Machine learning subsystem 114 may determine the constraint based on the preferences retrieved from the account. Machine learning subsystem 114 may train, using the constraints and the plurality of training input vectors, the stochastic machine learning model to generate images for access tokens in accordance with the constraints. In some embodiments, training the stochastic machine learning model to generate the images for the access tokens in accordance with the constraints may involve inputting, into a training routine of the stochastic machine learning model, the constraints to train the stochastic machine learning model to generate images for access tokens in accordance with the constraints. For example, machine learning subsystem 114 may determine, using a loss function, a discrepancy between the images generated by the stochastic machine learning model and the constraints. Machine learning subsystem 114 may then update the stochastic machine learning model based on the discrepancy. Machine learning subsystem 114 may continue this process until there is no discrepancy between the generated images and the constraints or until the discrepancy is below a threshold level.

In some embodiments, the constraints may guide the generation process and increase a likelihood of desired properties in the generated outputs. The constraints may include bounds or limits to control the range or limits of certain variables or attributes in the generated outputs. For example, in image generation, constraints may be set on pixel intensity values or color channels to ensure generated stochastic images remain within specific bounds. The constraints may include structural constraints, which may define a desired structure or composition of the generated outputs. Structural constraints may be related to the arrangement, layout, or relationships between different elements. The constraints may include semantic constraints, which may ensure that the generated outputs adhere to specific semantic properties or meanings. These constraints can be based on domain-specific rules or requirements. In some embodiments, constraints may include style constraints, which may aim to capture and reproduce specific stylistic elements or characteristics in the generated outputs. For instance, in generating images, style constraints can be applied to mimic a particular artistic style, color palette, or visual theme. The constraints may include user-defined constraints, which may allow users to define their own constraints based on specific requirements. These constraints can reflect personal preferences, guidelines, or specific objectives that the generated outputs should satisfy. In some embodiments, the constraints may include other types of constraints. In some embodiments, the constraints may be incorporated through loss functions, regularization techniques, optimization objectives, specific architectural choices, or other means.

As an example, one or more constraints may indicate a particular design that is desired for the output. A constraint may, for example, indicate that the stochastic image generated by the stochastic machine learning model should feature a particular category of transactions (e.g., transactions at coffee retailers). In some embodiments, another constraint may indicate that the stochastic image should feature the category of transactions in a particular way (e.g., one coffee cup for every ten dollars spent at coffee retailers in the past month). In some embodiments, one or more constraints may guide the stochastic machine learning model to incorporate other information into the stochastic image (e.g., weather, time of day, time of year, age of account associated with the token, information about the user, or other information). In some embodiments, the stochastic machine learning model may generate the stochastic image based on a combination of these or other constraints.

As previously discussed, communication subsystem 112 may obtain, based on a request to register a token with a mobile application, token data associated with the token and event data associated with one or more events related to the token. Embedding subsystem 116 may generate one or more token embeddings using the token data and the event data. Machine learning subsystem 114 may provide the token embeddings to a stochastic machine learning model to obtain an image for the token. In some embodiments, system 102 (e.g., authentication subsystem 118) may register the token with the mobile application. For example, registering the token may involve associating the token identifier with the mobile application. To do so, authentication subsystem 118 may authenticate the user attempting to register the token with the mobile application. For example, authentication subsystem 118 may prompt the user to provide user credentials or other authentication forms associated with the mobile application. In some embodiments, authentication subsystem 118 may prompt the user to provide user credentials or other authentication forms associated with the token. Communication subsystem 112 may then send the token to the mobile application as part of the authentication response. The application may receive the token and store it securely. With the access token, the mobile application may now make authenticated requests to the server or APIs on behalf of the user. Whenever the application makes a request to the server, the server may validate the access token to ensure its authenticity and expiration. If the token is valid and the user has the necessary permissions, the server may process the request accordingly.

Once the token is registered with the mobile application, the token may be periodically updated. Updates may include updated operation data, updated authentication requirements, updated stochastic images, or other updates. To send an update, communication subsystem 112 may transmit a push notification from a web service associated with the token to a device on which the mobile application is stored. In some embodiments, the push notification may include an empty file. The push notification may alert the device that an update is available. Communication subsystem 112 may receive, from the device, a GET request and may transmit the GET request to the web service. For example, a GET request may be used by mobile applications to request data or resources from a web server or web service. The GET request may retrieve information from the server or web service without causing side effects on the server or the data. The GET request may include a URL as part of the request. The web service may process the request, locate the update, and send back the requested data or content in the response (e.g., via communication subsystem 112). The response may include a payload specifying information about the update, the token, the image representation of the token, or other information.

In response to registration of the token with the mobile application, communication subsystem 112 may generate, for display on a user interface associated with the account, an image representation of the access token. For example, communication subsystem 112 may transmit a payload including the image representation to the mobile application. For example, the image representation may include the stochastic image generated by the stochastic machine learning model. In some embodiments, the image may be generated in response to a certain trigger. For example, communication subsystem 112 may generate the image for display in response to a user activation of the mobile application. In some embodiments, communication subsystem 112 may generate, for display, a home page or other display of the mobile application, which may include the image representation. In some embodiments, communication subsystem 112 may output the image representation for the image to be displayed, projected, or printed onto a physical object. In some embodiments, communication subsystem 112 may display the image representation in another manner. The image representation may improve an authorized user's recognition of the token or use thereof (e.g., to enable the user to better distinguish the token from other tokens via a model-generated image for the token, to prevent inadvertent use of the wrong token by an authorized user, etc.).

In some embodiments, the image representation may include one or more other pieces of information. For example, the image representation may include a token identifier, an account identifier associated with the user's account, a name or other identifier of the user, a date, an age of the account, one or more PINs or other codes, or other information. In some embodiments, these other pieces of information may be superimposed onto the stochastic image once it has been generated. In some embodiments, these other pieces of information may be incorporated into the stochastic image once it has been generated.

In some embodiments, system 102 may generate a deep-linked stochastic image using the stochastic image generated by the stochastic machine learning model. Deep-linked items may include content, pages, or resources that can be directly accessed through a deep link. A deep link may include a URL or link that takes users directly to the content, pages, or resources, bypassing the app's or website's home page or main landing page. In some embodiments, generating the stochastic image for display may include generating, for display, a deep-linked stochastic image. The deep-linked stochastic image may be a deep link embedded in the stochastic image. The deep link may link to application functionality for transmitting the token. For example, application functionality may include transmitting the token in connection with one or more operations (e.g., such as operations 303, as shown in FIG. 3). For example, application functionality may include performing transactions using the token. For example, application functionality may include performing transactions using the token as a payment method or payment account. In some embodiments, the deep link may link to other application functionality.

In some embodiments, the stochastic images may include other functionality. For example, the stochastic image may be displayed as a scannable image. One or more scannable features may be included in the stochastic image. For example, a scannable feature may include a quick response (QR) code, which is a type of scannable 2D barcode that contains information that can be quickly and easily read by devices. Other scannable features may include other types of bar codes, data matrix codes, Microsoft tags, Snapcodes, Radio-Frequency Identification (RFID) tags, Near Field Communication (NFC) tags, or other scannable features. In some embodiments, scanning may require the use of a camera, radio waves, or another device in close proximity to the scannable feature. In some embodiments, the scannable feature may be incorporated into the stochastic image during the image generation process, superimposed on the stochastic image after generation, physically added to the stochastic image or an object on which the stochastic image is displayed, or otherwise incorporated into the stochastic image. In some embodiments, scanning the scannable feature may launch functionality associated with the scannable feature. For example, the functionality may enable system access, payment request, payment transfer, user authentication, merchant authentication, information retrieval, or other functionality. For example, in some embodiments, scanning the scannable feature may activate a onetime use token. In some embodiments, the stochastic image or the scannable feature may be regenerated after each use, periodically at a certain frequency, or at another time. In some embodiments, a scannable feature may be incorporated into any of the embodiments discussed herein.

Facilitating Token Use Authentication for an Access Token Using Stochastic Images In some embodiments, system 100 may facilitate token use authentication for an access token using stochastic-model-derived images.

Some embodiments involve facilitating token use authentication for an access token using stochastic-model-derived images. Communication subsystem 112 may detect an authentication request to authenticate use of an access token. For example, a user may be attempting to gain access to a system using the access token. The access token may be associated with a first image previously displayed to an authenticated user of the access token. For example, the first image may have been displayed to the authenticated user in connection with a prior event, such as when the access token was previously used to grant access to a system. Communication subsystem 112 may retrieve, from storage, the first image previously displayed to the authenticated user and one or more input parameters previously used to generate the first image. The input parameters may correspond to token data associated with the access token and may have previously been input into a model to generate the first image. In some embodiments, machine learning subsystem 114 may provide the input parameters to a stochastic machine learning model to obtain a second image different from the first image. Communication subsystem 112 may then generate, for display, an image set including the first image and the second image. Communication subsystem 112 may receive a selection of the first image from the image set and authentication subsystem 118 may grant the authentication request based on the selection of the first image. Authentication subsystem 118 may thus perform authentication for one or more events (e.g., prior to authorizing one or more network operations or other events).

In some embodiments, communication subsystem 112 may detect an authentication request to authenticate use of a token to perform a network operation. The token may be associated with a first stochastic image that was previously displayed to an authenticated user of the token. For example, the token may be used to perform operations (e.g., authentication, transactions, registration, or other operations). For a previous operation, communication subsystem 112 may have previously displayed the first stochastic image to the user of the token. Communication subsystem 112 may have then stored the first stochastic image and one or more image generation parameters used to generate the first stochastic image.

In response to detecting the authentication request, communication subsystem 112 may retrieve, from storage, the first stochastic image previously displayed to the authenticated user and input parameters (e.g., image generation parameters) previously used to generate the first stochastic image. The image generation parameters may include one or more inputs to a stochastic machine learning model. In some embodiments, the image generation parameters may correspond to token data associated with the token. For example, the token data may include a token identifier, account data associated with the token, data associated with a user of the token, operation data associated with the token (e.g., for operations performed with the token), or other data. In some embodiments, machine learning subsystem 114 may provide the input parameters to a stochastic machine learning model to obtain a second image different from the first image. Communication subsystem 112 may then generate, for display, an image set including the first image and the second image. Communication subsystem 112 may use the image set to either grant or decline the authentication request.

FIG. 4 illustrates a data structure 400 storing image generation parameters for generating stochastic images (or other model-generated images), in accordance with one or more embodiments. In some embodiments, data structure 400 may be a subset of a larger data structure. Data structure 400 may include images 403. For example, images 403 may include the first stochastic image, which was previously displayed to the authenticated user. The first stochastic image may have been generated by a stochastic machine learning model using values for parameter 406, parameter 409, parameter 412, parameter 415, and any other parameters. In some embodiments, parameter 406, parameter 409, parameter 412, and parameter 415 may include the parameter types or constraint types discussed above or other parameter or constraint types. In some embodiments, the same values for parameter 406, parameter 409, parameter 412, and parameter 415 may be provided to the stochastic machine learning model one or more times to obtain, from the stochastic machine learning model, different stochastic images based on the same input. For example, images 403 may include one or more additional images, such as a second stochastic image. The second stochastic image may be generated using the same image generation parameters as the first stochastic image (e.g., the same values for parameter 406, parameter 409, parameter 412, and parameter 415). The second stochastic image may be different from the first stochastic image even though they are generated from identical input parameters (e.g., as discussed in greater detail in relation to FIG. 5).

Machine learning subsystem 114 may obtain one or more stochastic images via a stochastic machine learning model. For example, machine learning subsystem 114 may provide image generation parameters (e.g., such as those shown in FIG. 4) to the stochastic machine learning model. Machine learning subsystem 114 may provide the image generation parameters previously used to generate the first stochastic image to the stochastic machine learning model to obtain a second stochastic image. The second stochastic image may be different from the first stochastic image despite the image generation parameters used to obtain the second stochastic image being identical to the image generation parameters previously used to generate the first stochastic image. In one use case, where a token is a VCN, the image generation parameters may include the card number (e.g., 5457498862041321), an expiration date for VCN (e.g., 01/25), a CVV (e.g., 589), a user-selected theme, user data of an authorized user of the token, one or more events related to use of the token, or other parameters. In some embodiments, the generated images or variations thereof (e.g., a hash of an image) may be stored for future verification purposes.

FIG. 5 illustrates sets of model-generated images, in accordance with one or more embodiments. For example, a first set of model-generated images may include image 500 and image 525. A second set of model-generated images may include image 550 and image 575. In some embodiments, the images of each set may be generated using identical image generation parameters. The stochastic images within a set may differ from each other even though they are generated using the same parameters. In one scenario, where a token is a VCN, the image generation parameters provided to an input layer of a stochastic machine learning model to generate images 500 and 525 of the first set may be the card number "5457498862041321," the expiration date "01/25", and the CVV "589." In another scenario, the image generation parameters provided to the input layer of the stochastic machine learning model to generate images 550 and 575 of the second set may be the card number "5457491098207653," the expiration date "01/25", the CVV "489," and a user-selected theme "Pets." In each scenario, despite the image generation parameters inputted to the model being exactly the same, the resulting images are different.

As another example, the image generation parameters used to generate the first set (e.g., image 500 and image 525) may include a prompt for an image including "scenery of far-off mountains with a stream running toward the viewer." The image generation parameters used to generate the second set (e.g., image 550 and image 575) may include a prompt for an image including "a dog looking up at fish flying around its head."

In some embodiments, one image out of an image set shown in FIG. 5 may represent an image previously displayed to an authenticated user. For example, image 500 may have been previously displayed to the authenticated user. Communication subsystem 112 may retrieve image

500 from storage and may display image 500 to a user, along with image 525 (generated using the same image generation parameters as image 500) as an authentication test. The user may be prompted to select the image that was previously displayed. If the user selects image 500, authentication subsystem 118 may authenticate the user. With respect to the foregoing scenarios (e.g., related to the token being a VCN), the images generated via a stochastic model are different despite using the same model (e.g., with the same hyperparameters, weights, biases, etc.) and the exact same inputs. In this way, for example, if a stochastic image is used as a security image, a malicious actor could not generate the same security image even if the malicious actor has all the same resources used to generate the original security image.

In some embodiments, machine learning subsystem 114 may provide other inputs to the stochastic machine learning model. For example, machine learning subsystem 114 may apply one or more processing techniques to data (e.g., source data, image generation parameters, or other data) before it is input into the stochastic machine learning model. Processing techniques may include generating embeddings based on the data, cleaning the data, transforming the data, scaling the data, encoding the data, performing feature engineering, or performing other processing techniques. In some embodiments, the post-processing data may be input into the stochastic machine learning model. In some embodiments other data may be input into the stochastic machine learning model.

Communication subsystem 112 may generate, for display, an image set including the first image and the second image. In some embodiments, the image set may include additional images. For example, the image set may include one or more additional stochastic images generated by the stochastic machine learning model using the image generation parameters used to generate the first image. In some embodiments, the image set may include one or more real images (e.g., as opposed to stochastic images). For example, one or more images of the image set may be images retrieved based on data relating to the operations (e.g., source data). As an example, the first image may be the stochastic image previously shown to the user, a second image may be a stochastic image generated using the same parameters as the first image, and a third image may be a real image (e.g., a public image, an image retrieved from an external source or database, etc.) retrieved based on the operation data. In some embodiments, one or more portions of the other images in the image set may include real images (e.g., as opposed to a stochastic image) retrieved from an external source or database or uploaded by the user. For example, a fourth image may include real images as well as stochastic images generated using a stochastic machine learning model. An image may, for example, include a real image of the user as well as stochastic portions, such as a stochastic background or other stochastic portions. As an illustrative example, for a token associated with a particular merchant (e.g., a coffee shop), the image may depict the user (e.g., from a real image uploaded by the user) with a stochastic background (e.g., surrounded by floating coffee cups). In some embodiments, one or more portions of an image may be enhanced using one or more enhancements or modifications (e.g., discussed in greater detail below). In some embodiments, one or more portions of an image may be otherwise modified. In embodiments in which multiple images in the image set include one or more real portions and one or more stochastic portions, because multiple images include real and stochastic portions, it will be much more difficult for malicious actors to identify which of the images is the correct image for authentication purposes.

While, in some embodiments, stochastic machine learning models are used to generate or modify the images, other embodiments may use non-stochastic machine learning models to generate or modify the images. In some embodiments, communication subsystem 112 may apply one or more enhancements or modifications to one or more of the images in the image set. For example, communication subsystem 112 may apply one or more filters, effects, lighting or color adjustments, or other enhancements to one or more of the images in the image set. For example, communication subsystem 112 may apply one or more rule-based filters. Rule-based filters for images may include techniques that apply specific rules or criteria to process and manipulate images. These filters may use predefined rules to modify or enhance different aspects of the image, such as color, contrast, brightness, sharpness, and more. Rule-based filters may follow explicit instructions to alter the appearance of an image. In some embodiments, communication subsystem 112 may otherwise modify images in the image set, for example, by cropping, blurring, or otherwise modifying the images.

As discussed above, communication subsystem 112 may detect an authentication request to authenticate use of an access token. The access token may be associated with a first image previously displayed to an authenticated user of the access token. Communication subsystem 112 may retrieve, from storage, the first image previously displayed to the authenticated user and one or more input parameters previously used to generate the first image. In some embodiments, machine learning subsystem 114 may provide the input parameters to a stochastic machine learning model to obtain a second image different from the first image. Communication subsystem 112 may then generate, for display, an image set including the first image and the second image. Communication subsystem 112 may display the image set to a user, along with instructions to select an image that has been previously displayed to the authenticated user. For example, the instructions may inform the user that, to become authenticated, the user must select an image with which the user is familiar. If the user is an authorized user of the account, the user is likely familiar with the first image and is unfamiliar with the other images in the image set, including the second image. In some embodiments, communication subsystem 112 may enable a limited number of attempts by the user. For example, the user may be limited to a single attempt, two attempts, or another limited number of attempts. The number of attempts may be limited to avoid allowing a malicious actor to learn the image or images previously displayed to the authenticated user. For example, the user may have only one chance to select the correct image before an alternative authentication technique is used (e.g., to avoid the user from seeing the stored image being repeatedly displayed and easily guessing the correct image).

Authentication subsystem 118 may generate an authentication response based on the image selected by the user. For example, in response to a user image selection from the authentication image set, authentication subsystem 118 may generate an authentication response to the authentication request such that the authentication response involves granting the authentication request in response to a first user selection of the first stochastic image or declining the authentication request in response to a second user selection of the second stochastic image. Authentication subsystem 118 may, for example, grant the authentication request if the user selects the image that has been previously displayed to the user and decline the authentication request if the user selects an image that has never before been displayed to the user.

In some embodiments, granting the authentication request may involve authentication subsystem 118 granting the user a session token or access token for the system. This token may serve as proof of authentication and authorization and may be used to access a requested account or resource during the current session. During the authenticated session, authentication subsystem 118 may manage the user's session, including tracking session timeouts, handling session renewals, or ensuring the security of the user's interactions with the system. In some embodiments, authentication subsystem 118 may store a record of the granted access as an operation for future reference (e.g., in data structure 300, as shown in FIG. 3).

In some embodiments, declining the authentication request may involve denying or revoking access to the system or the requested resource. In some embodiments, communication subsystem 112 may display an error message indicating the authentication failure or simply block the user from proceeding. In some embodiments, authentication subsystem 118 may block the user from accessing or attempting to access the account or system again for a certain time period after the instance of declined access. In some embodiments, authentication subsystem 118 may store a record of the declined access as an operation for future reference (e.g., in data structure 300, as shown in FIG. 3).

In some embodiments, authentication subsystem 118 may require additional information from the user in order to authenticate access to the token. For example, communication subsystem 112 may retrieve, from storage, a first image representation of the first image. For example, a representation of the first image may include a hash of a scaled-down version of the image or portion of the image. A hash may be a compact representation of an image's content. In some embodiments, this may involve resizing the first image to a smaller size. From the resized image, specific features may be extracted. These features may include color information, texture patterns, or other characteristics that define the image's content. The extracted features may then be converted into a hash value using a hash function. For example, a hash function is a mathematical algorithm that takes an input and produces a fixed-size string of characters, which is typically a sequence of numbers and letters. A hash function may take the image's features and transform them into a fixed-size hash code, which serves as a unique representation of the image's content. The hash may capture the essential features of the image in a condensed form that is suitable for quick comparison or identification. In some embodiments, different hashing techniques can be used, such as perceptual hashing (pHash), average hash (aHash), or difference hash (dHash). Each method has its own way of extracting and hashing image features. In some embodiments, the first image representation may have been previously transmitted to the authenticated user.

Communication subsystem 112 may display the image set to a user along with instructions to input an image representation corresponding to a selected image of the image set. For example, communication subsystem 112 may display the first image and the second image along with instructions to select the image that has been previously displayed to the user and to upload an image representation corresponding to the image that has been previously displayed to the user. Communication subsystem 112 may receive a candidate image representation corresponding to the selection of the first image from the image set. Authentication subsystem 118 may compare the candidate image representation and the first image representation. Authentication subsystem 118 may grant the authentication request based on determining that the candidate image representation matches the first image representation. In some embodiments, authentication subsystem 118 may decline the authentication request based on determining that the candidate image representation does not match the first image representation.

In some embodiments, communication subsystem 112 may request, from the authenticated user, a secret associated with the authenticated user. A secret may be a piece of information that is known only to the authorized user and the system the user is trying to access. Secrets may be used as a form of authentication to verify a user's identity and provide access to a protected resource, such as an account, application, or system. A secret may include a password, passphrase, personal identification number (PIN), authentication token, biometric data, or other information. Secrets may be used in combination with usernames, email addresses, or other identifiers to create a secure authentication process. In some embodiments, only the authenticated user may possess the correct secret, which they may provide during the authentication process to prove their identity. In some embodiments, the secret may be applicable to a user, a user profile, or a user's account, or a secret may be specific and unique to each token (e.g., each VCN) associated with the user. Communication subsystem 112 may receive, from the user, the secret associated with the user.

In some embodiments, authentication subsystem 118 may use the secret to generate an image layer. For example, authentication subsystem 118 may use a hash function to generate a fixed-size key from the user's secret. In some embodiments, authentication subsystem 118 may convert the secret or the fixed-size key into a sequence of numbers determining pixel values of an image layer. For example, authentication subsystem 118 may use a number generator (e.g., a pseudorandom number generator or other number generator) to generate the sequence of numbers from the secret or fixed-size key determining the pixel values. Using the sequence of numbers, authentication subsystem 118 may generate the image layer. In some embodiments, authentication subsystem 118 may apply the image layer to the first image to generate a first authentication image. For example, authentication subsystem 118 may superimpose or overlay the image layer on the first image to generate the first authentication image. This may be done by blending the pixel values of the overlay image with the corresponding pixel values of the original image. The blending can be additive, subtractive, or based on transparency, depending on the effect you want to achieve. In some embodiments, authentication subsystem 118 may use the first authentication image to authenticate the user.

For example, generating the authentication response to the authentication request may involve granting the authentication request in response to determining that the first authentication image includes a hidden image that is unique to the authenticated user. For example, the combination of the image layer and the first image may create or re-create an image that is unique to the user. In some embodiments, the image may be random. In some embodiments, the image may be a recreation of an image that was originally received from the user. In some embodiments, the hidden image may be a watermark, overlayed text, an annotation, a numerical code, a scannable feature, an interactive element, a user image, or another image. In some embodiments, the image may have been previously displayed to the user.

In some embodiments, machine learning subsystem 114 may generate an input including the first image and a secret associated with the authenticated user. In some embodiments, machine learning subsystem 114 may provide the input to a machine learning model trained to generate authentication representations based on images and secrets. For example, providing the input to the machine learning model may cause the machine learning model to generate a first authentication image. Authentication subsystem 118 may generate an authentication response based on the first authentication image. For example, granting the authentication request based on the selection of the first image may further require determining that the first authentication image includes a hidden image that is unique to the authenticated user. In some embodiments, authentication subsystem 118 may decline the authentication request based on determining that the first authentication image does not include a hidden image that is unique to the authenticated user. In some embodiments, the image may be random. In some embodiments, the image may be a recreation of an image that was originally received from the user. In some embodiments, the image may have been previously displayed to the user.

Some embodiments involve facilitating token use authentication for an access token using stored representations of stochastic-model-derived images. Communication subsystem 112 may detect an authentication request to authenticate use of a token. For example, a user may be attempting to gain access to a system using the token. The token may be associated with a first image previously displayed to an authenticated user of the access token. In some embodiments, the first image was previously generated via a stochastic machine learning model using token data associated with the token as input parameters to the stochastic machine learning model. Communication subsystem 112 may retrieve, from storage, a stored representation of at least a portion of the first image previously displayed to the authenticated user. Communication subsystem 112 may further receive (e.g., from the user) an image representation related to the token in connection with the authentication request. Authentication subsystem 118 may then generate an authentication response to the authentication request based on the stored representation of at least the portion of the first image and the image representation of the authentication request. For example, authentication subsystem 118 may compare the stored representation and the image representation to determine whether the image representation matches the stored representation. If the image representation matches the stored representation, authentication subsystem 118 may grant the authentication request.

In particular, communication subsystem 112 may detect an authentication request to authenticate use of a token. The token may be associated with a first image that was previously displayed to an authenticated user of the token. For example, the token may be used to perform operations (e.g., authentication, transactions, registration, or other operations). For a previous operation, communication subsystem 112 may have previously displayed the first image to the user of the token. In some embodiments, the first image may have been previously generated via a stochastic machine learning model using token data associated with the token as input parameters to the stochastic machine learning model. For example, the token data may include operation data, account data, user data, or other data. Operation data may include records of account access that has been granted or declined, including details of each occurrence of granted or declined access. Account data may include account identifiers, token identifiers, account history, authentication information, or other data. User data may include user identifiers, authentication information, user history, or other data. In some embodiments, at the time of previously displaying the first image to the user, communication subsystem 112 may have stored the first image. In some embodiments, communication subsystem 112 may have stored the first image before or after previously displaying the first image to the user.

In some embodiments, communication subsystem 112 may retrieve, from storage, a stored representation of at least a portion of the first image previously displayed to the authenticated user. For example, the stored representation of the first image or a portion of the first image may include a hash of a scaled-down version of the image or portion of the image. A hash may be a compact representation of an image's content. In some embodiments, this may involve resizing the image to a smaller size. From the resized image, specific features may be extracted. These features may include color information, texture patterns, or other characteristics that define the image's content. The extracted features may then be converted into a hash value using a hash function. For example, a hash function is a mathematical algorithm that takes an input and produces a fixed-size string of characters, which is typically a sequence of numbers and letters. A hash function may take the image's features and transform them into a fixed-size hash code, which serves as a unique representation of the image's content. The hash may capture the essential features of the image in a condensed form that is suitable for quick comparison or identification. In some embodiments, different hashing techniques can be used, such as perceptual hashing (pHash), average hash (aHash), or difference hash (dHash). Each method has its own way of extracting and hashing image features.

In some embodiments, other methods of representing the first image may be used. For example, the first image may be represented using pixel values, color histograms, feature vectors, principal component analysis (PCA), wavelet transformation, deep learning features, vector quantization, graph-based representations, textual descriptions, or other techniques. In some embodiments, a combination of these or other techniques may be used to generate a representation of the first image.

As previously discussed, communication subsystem 112 may detect an authentication request to authenticate use of a token to perform a network operation. In some embodiments, the token may be associated with a first image previously displayed to an authenticated user of the token. The first image may have been previously generated via a stochastic machine learning model using token data associated with the token as input parameters to the stochastic machine learning model. Communication subsystem 112 may retrieve a stored representation (e.g., a stored hash) of at least a portion of the first image previously displayed to the authenticated user. In some embodiments, communication subsystem 112 may receive an image representation related to the token in connection with the authentication request. For example, the image representation may be a hash of a scaled-down version of the first image. In some embodiments, the image representation (e.g., hash) may have been previously transmitted to the authenticated user. For example, the image representation may have been transmitted to the user before, at the time of, or after the image representation was stored (e.g., as the stored representation). In some embodiments, the image representation may be a different representation. Authentication subsystem 118 may then generate an authentication response to the authentication request based on the stored representation and the image representation.

In some embodiments, authentication subsystem 118 may compare the stored representation and the image representation to determine whether the image representation matches the stored representation. For example, if the received image representation matches the stored representation, this indicates that the received image representation is the same representation that was previously transmitted to the authenticated user. Thus, the image representation was likely received from the authenticated user. Authentication subsystem 118 may generate an authentication response to the authentication request based on the stored representation of at least the portion of the first image and the image representation of the authentication request. For example, authentication subsystem 118 may grant the authentication request in response to determining that the image representation matches the stored representation. In some embodiments, authentication subsystem 118 may decline the authentication request in response to determining that the image representation does not match the stored representation.

In some embodiments, one or more steps may be required to compare the stored representation and the image representation. For example, in some embodiments, to compare the stored representation and the image representation, machine learning subsystem 114 may generate an input including the image representation and a secret associated with the authenticated user. For example, communication subsystem 112 may request that the user provide the secret. In some embodiments, the user may provide the secret with the authentication request. A secret may be a piece of information that is known only to the authorized user and the system the user is trying to access. Secrets may be used as a form of authentication to verify a user's identity and provide access to a protected resource, such as an account, application, or system. A secret may include a password, passphrase, PIN, authentication token, biometric data, or other information. Secrets may be used in combination with usernames, email addresses, or other identifiers to create a secure authentication process. In some embodiments, only the authenticated user may possess the correct secret, which they may provide during the authentication process to prove their identity. The input generated by machine learning subsystem 114 may thus include the image representation (e.g., hash) and the secret possessed only by the authenticated user. In some embodiments, the secret may provide added security to the system, as even if a malicious actor gains access to the image representation (e.g., hash), the malicious actor still needs to reverse engineer the original stored representation, which may be computationally challenging. In some embodiments, machine learning subsystem 114 may provide the input to a hash function to generate an authentication representation (e.g., to effectively reverse engineer the original stored representation). For example, the same hash function or a variation of the hash function may have previously been used to generate the image representation from the stored representation using the secret. In some embodiments, machine learning subsystem 114 may provide the input to a machine learning model trained to generate authentication representations based on representations and secrets. For example, providing the input to the machine learning model may cause the machine learning model to generate an authentication representation.

In some embodiments, the authentication subsystem 118 may compare the authentication representation to the stored representation. In some embodiments, authentication subsystem 118 may generate an authentication response based on the comparison. For example, authentication subsystem 118 may grant the authentication request in response to determining that the authentication representation matches the stored representation. In some embodiments, authentication subsystem 118 may decline the authentication request in response to determining that the authentication representation does not match the stored representation.

In some embodiments, generating the authentication response using the secret may involve determining whether the authentication representation includes a hidden representation. For example, the authentication representation may be a code or a string of letters or numbers that includes a hidden representation that is unique to the authenticated user. For example, the hidden representation may be a password, passphrase, PIN, authentication token identifier, or other hidden representation that is unique to the authenticated user. The combination of the image representation and the secret may reveal the hidden representation, and authentication subsystem 118 may authenticate the user in response to determining that the authentication representation includes the hidden representation. In some embodiments, authentication subsystem 118 may decline to authenticate the user in response to determining that the authentication representation does not include the hidden representation.

In some embodiments, authenticating the user using a secret may involve generating an image layer using the secret. For example, authentication subsystem 118 may use a hash function to generate a fixed-size key from the user's secret. In some embodiments, authentication subsystem 118 may convert the secret or the fixed-size key into a sequence of numbers determining pixel values of an image layer. For example, authentication subsystem 118 may use a number generator to generate the sequence of numbers determining the pixel values. In some embodiments, the number generator may be random or may use a predetermined function to generate the sequence of numbers. Using the sequence of numbers, authentication subsystem 118 may generate the image layer. In some embodiments, authentication subsystem 118 may apply the image layer to the first image to generate a first authentication image. For example, authentication subsystem 118 may superimpose or overlay the image layer on the first image to generate the first authentication image. This may be done by blending the pixel values of the overlay image with the corresponding pixel values of the original image. The blending can be additive, subtractive, or based on transparency, depending on the effect you want to achieve. In some embodiments, authentication subsystem 118 may use the first authentication image to authenticate the user.

For example, generating the authentication response to the authentication request may involve granting the authentication request in response to determining that the first authentication image includes a hidden image that is unique to the authenticated user. For example, the combination of the image layer and the first image may create or re-create an image that is unique to the user. In some embodiments, the image may be random. In some embodiments, the image may be a re-creation of an image that was originally received from the user. In some embodiments, the image may have been previously displayed to the user.

As previously discussed, communication subsystem 112 may detect an authentication request to authenticate use of a token. Communication subsystem 112 may retrieve, from storage, a stored representation of at least a portion of the first image previously displayed to the authenticated user. The first image may have been previously generated via a stochastic machine learning model using token data associated with the token as input parameters to the stochastic machine learning model. In some embodiments, machine learning subsystem 114 may provide the input parameters to the stochastic machine learning model to obtain a second image different from the first image. Communication subsystem 112 may generate, for display, an image set including the first image and the second image. Communication subsystem 112 may then receive (e.g., from the user) a selection of the first image from the image set. In some embodiments, communication subsystem 112 may further receive (e.g., from the user) an image representation related to the token in connection with the authentication request. In some embodiments, receiving the image representation may involve receiving, in connection with the selection of the first image, the image representation of the first image. Authentication subsystem 118 may then generate an authentication response to the authentication request based on the selection of the first image and the receipt of the image representation. For example, authentication subsystem 118 may grant the authentication request in response to determining that the user selected the first image and that the image representation matches a stored representation of the first image. In some embodiments, if the user does not select the first image or if the received image representation does not match the stored representation, authentication subsystem 118 may decline the authentication response.

Identifying Malicious Activity Using Deep-Linked Items Related to Stochastic Images In some embodiments, system 100 may facilitate generation of deep-linked items related to stochastic images derived from operation data.

Some embodiments involve generating deep-linked items related to stochastic images derived from operation data. Deep-linked items may include content, pages, or resources that can be directly accessed through a deep link. A deep link may include a URL or link that takes users directly to the content, pages, or resources, bypassing the app's or website's home page or main landing page. Communication subsystem 112 may receive event data associated with an event performed in connection with a token. For example, the event data may include records of access granted or denied using the token. Embedding subsystem 116 may generate a token embedding based on the event data and may provide the token embedding to a stochastic machine learning model to obtain an image related to the event. Communication subsystem 112 may generate, for display, the image and the event data. The user may review the image and event data to verify that the event is valid. For example, the image and event data may convey to a user the events, such as instances of granted or denied access using the token, along with image representations of those instances. In some embodiments, each image may be deep-linked to functionality for submitting feedback relating to the events. In some embodiments, communication subsystem 112 may receive feedback related to the image indicating an invalid event. For example, the user may not recognize one of the instances. Authentication subsystem 118 may then perform, based on the feedback related to the image, one or more remedial actions related to the token or to the event.

Communication subsystem 112 may receive, based on a token identifier associated with a token in a mobile application, event data (e.g., operation data) associated with network operations performed with the token. The operation data may include records of access granted or declined, including details of each occurrence of granted or declined access. The operation data may include records of registration requests that have been granted or declined, including details of each occurrence of granted or declined registration. In some embodiments, communication subsystem 112 may further receive token data associated with the token. Token data may include a token identifier, account data associated with the token, data associated with a user of the token, operation data associated with the token (e.g., for operations performed with the token), or other data.

Embedding subsystem 116 may generate a token embedding using respective operation data corresponding to a network operation and token data based on the token identifier. In some embodiments, embedding subsystem 116 may generate a token embedding for each network operation of the network operations performed with the token. The token embedding may be a numerical representation of a token for input into a machine learning model. The process of generating token embeddings may involve mapping each token to a numerical vector in an embedding space. For example, an embedding space may be a mathematical representation of data in the form of numerical vectors, where similar data points are close together and dissimilar data points are farther apart.

Machine learning subsystem 114 may provide the token embedding to a stochastic machine learning model to obtain a stochastic image for the network operation. In some embodiments, machine learning subsystem 114 may obtain, via the stochastic machine learning model, one or more stochastic images based on a token embedding. For example, the stochastic machine learning model may be trained to generate stochastic images based on token embeddings. In some embodiments, the stochastic machine learning model may be trained to generate stochastic images based on token embeddings that have been processed using one or more processing techniques. In some embodiments, the stochastic machine learning model may be trained to generate stochastic images based on other data. In some embodiments, the stochastic machine learning model may be machine learning model 202, as shown in FIG. 2. In some embodiments, the stochastic machine learning model may output one or more stochastic images, as discussed above in relation to FIG. 2. Communication subsystem 112 may generate, for display, the stochastic images and the event data. In some embodiments, each stochastic image may be deep-linked to functionality for submitting feedback relating to the events. In some embodiments, authentication subsystem 118 may use the deep-linked stochastic images to receive feedback relating to the event data and perform, based on the feedback, one or more remedial actions related to the token or to an event.

In some embodiments, machine learning subsystem 114 may place one or more constraints on the outputs from the stochastic machine learning model. To do so, communication subsystem 112 may retrieve a token identifier associated with the access token. Machine learning subsystem 114 may determine the constraint based on the preferences retrieved from the account. Machine learning subsystem 114 may train, using the constraints and the plurality of training input vectors, the stochastic machine learning model to generate images for access tokens in accordance with the constraints. In some embodiments, training the stochastic machine learning model to generate the images for the access tokens in accordance with the constraints may involve inputting, into a training routine of the stochastic machine learning model, the constraints to train the stochastic machine learning model to generate images for events in accordance with the constraints. For example, machine learning subsystem 114 may determine, using a loss function, a discrepancy between the images generated by the stochastic machine learning model and the constraints. Machine learning subsystem 114 may then update the stochastic machine learning model based on the discrepancy. Machine learning subsystem 114 may continue this process until there is no discrepancy between the generated images and the constraints or until the discrepancy is below a threshold level.

In some embodiments, the constraints may guide the generation process and increase a likelihood of desired properties in the generated outputs. The constraints may include bounds or limits to control the range or limits of certain variables or attributes in the generated outputs. For example, in image generation, constraints may be set on pixel intensity values or color channels to ensure generated stochastic images remain within specific bounds. The constraints may include structural constraints, which may define a desired structure or composition of the generated outputs. Structural constraints may be related to the arrangement, layout, or relationships between different elements. The constraints may include semantic constraints, which may ensure that the generated outputs adhere to specific semantic properties or meanings. These constraints can be based on domain-specific rules or requirements. In some embodiments, constraints may include style constraints, which may aim to capture and reproduce specific stylistic elements or characteristics in the generated outputs. For instance, in generating images, style constraints can be applied to mimic a particular artistic style, color palette, or visual theme. The constraints may include user-defined constraints, which may allow users to define their own constraints based on specific requirements. These constraints can reflect personal preferences, guidelines, or specific objectives that the generated outputs should satisfy. In some embodiments, the constraints may include other types of constraints. In some embodiments, the constraints may be incorporated through loss functions, regularization techniques, optimization objectives, specific architectural choices, or other means.

As an example, one or more constraints may indicate a particular design that is desired for the output. A constraint may, for example, indicate that the stochastic image generated by the stochastic machine learning model should feature a particular category of transactions. In some embodiments, another constraint may indicate that the stochastic image should feature the category of transactions in a particular way. In some embodiments, one or more constraints may guide the stochastic machine learning model to incorporate other information into the stochastic image (e.g., weather, time of day, time of year, age of account associated with the token, information about the user, or other information). In some embodiments, the stochastic machine learning model may generate the stochastic image based on a combination of these or other constraints.

While, in some embodiments, stochastic machine learning models are used to generate or modify the images, other embodiments may use non-stochastic machine learning models to generate or modify the images. In some embodiments, communication subsystem 112 may apply one or more enhancements or modifications to one or more of the images in the image set. For example, communication subsystem 112 may apply one or more filters, effects, lighting or color adjustments, or other enhancements to one or more of the images in the image set. For example, communication subsystem 112 may apply one or more rule-based filters. Rule-based filters for images may include techniques that apply specific rules or criteria to process and manipulate images. These filters may use predefined rules to modify or enhance different aspects of the image, such as color, contrast, brightness, sharpness, and more. Rule-based filters may follow explicit instructions to alter the appearance of an image. In some embodiments, communication subsystem 112 may otherwise modify images in the image set, for example, by cropping, blurring, or otherwise modifying the images.

In some embodiments, communication subsystem 112 may generate, for display on the mobile application, the stochastic image generated by the stochastic machine learning model. In some embodiments, communication subsystem 112 may generate the stochastic image for display at a time of an operation or event. For example, at the time of the operation or event, communication subsystem 112 may generate the stochastic image for display on a user device. In some embodiments, communication subsystem 112 may additionally display data about the operation or event. For example, communication subsystem 112 may display the stochastic image with data about the corresponding operation or event. In some embodiments, communication subsystem 112 may further generate, for display with the stochastic image, a prompt or question indicating that the user should submit feedback (e.g., by interacting with the stochastic image) if the corresponding operation is invalid. For example, the operation may indicate a transaction at a supermarket, but the user may not have performed that transaction. Communication subsystem 112 may thus receive feedback from the user indicating that the supermarket transaction is invalid. Authentication subsystem 118 may then perform a remedial measure with respect to the operation or the token in response to receiving the feedback. In some embodiments, communication subsystem 112 may generate the stochastic image for display at another time, such as after the operation or event has occurred. In some embodiments, communication subsystem 112 may display a number of stochastic images for corresponding operations or events that occurred within a certain time period (e.g., the past day, week, month, etc.). In some embodiments, communication subsystem 112 may display stochastic images for a certain number of operations (e.g., the most recent ten operations). In some embodiments, communication subsystem 112 may display stochastic images corresponding to all new operations periodically (e.g., once a day, once a week, once a month, etc.). In some embodiments, communication subsystem 112 may transmit, to an account or device associated with the user, stochastic images corresponding to new operations periodically (e.g., once a day, once a week, once a month, etc.). In some embodiments, communication subsystem 112 may display the stochastic images at another time.

In some embodiments, the stochastic image may be a deep-linked item. Communication subsystem 112 may generate, for display on the mobile application, a deep-linked item related to the stochastic image and the respective operation data corresponding to the network operation. Deep-linked items may include content, pages, or resources that can be directly accessed through a deep link. A deep link may include a URL or link that takes users directly to the content, pages, or resources, bypassing the app's or website's home page or main landing page. The deep-linked item may include a deep link to application functionality for transmitting feedback related to use of the token for the network operation. For example, in response to detecting an interaction with the deep-linked item (e.g., a selection from the user), communication subsystem 112 may generate, for display, a web page or application with functionality for transmitting feedback related to use of the token for the network operation. In some embodiments, each deep-linked item may be a stochastic image generated by the stochastic machine learning model having the deep link to the application functionality for transmitting feedback. In some embodiments, communication subsystem 112 may display, with each deep-linked item, relevant operation or event data.

In some embodiments, communication subsystem 112 may generate the deep-linked item for display at a time of an operation or event. For example, at the time of the operation or event, communication subsystem 112 may generate the deep-linked item for display on a user device. In some embodiments, communication subsystem 112 may additionally display data about the operation or event. For example, communication subsystem 112 may display the deep-linked item with data about the corresponding operation or event. In some embodiments, communication subsystem 112 may further generate, for display with the deep-linked item, a prompt or question indicating that the user should submit feedback (e.g., by interacting with the deep-linked item) if the corresponding operation is invalid. For example, the operation may indicate a transaction at a coffee shop but the user may not have performed that transaction. Communication subsystem 112 may thus receive feedback from the user indicating that the coffee shop transaction is invalid. Authentication subsystem 118 may then perform a remedial measure with respect to the operation or the token in response to receiving the feedback. In some embodiments, communication subsystem 112 may generate the deep-linked item for display at another time, such as after the operation or event has occurred. In some embodiments, communication subsystem 112 may display a number of deep-linked items for corresponding operations or events that occurred within a certain time period (e.g., the past day, week, month, etc.). In some embodiments, communication subsystem 112 may display deep-linked items for a certain number of operations (e.g., the most recent ten operations). In some embodiments, communication subsystem 112 may display deep-linked items corresponding to all new operations periodically (e.g., once a day, once a week, once a month, etc.). In some embodiments, communication subsystem 112 may display the deep-linked items at another time.

FIG. 6 illustrates a data structure 600 storing images associated with network operations performed with a token, in accordance with one or more embodiments. In some embodiments, data structure 600 may be a subset of a larger data structure. Data structure 600 may include images 601, which may include the stochastic images generated by the stochastic machine learning model or the deep-linked items discussed above. In some embodiments, data structure 600 may additionally include operations 603, as well as operation data (e.g., feature 606, feature 609, feature 612, or other features) associated with each operation of operations 603. In some embodiments, the features may include location, time, or other data associated with operations 603. In some embodiments, data structure 600 may include operations 603 that have been performed using the token. In some embodiments, data structure 600 may include operations 603 that have been performed by authentication subsystem 118 using multiple tokens including the token. In some embodiments, operations 603 may include records of granted access, declined access, or both granted and declined access. In some embodiments, operations 603 may include records of granted registration, declined registration, or both granted and declined registration. In some embodiments, operations 603 may include transactions performed in association with an account. For example, operations 603 may include transactions performed by using the token as a payment method or payment account. In some embodiments, operations 603 may include other types of token operations. In some embodiments, data structure 600 may represent a variation of data structure 300, as shown in FIG. 3. In some embodiments, data structure 600 may represent data structure 300 with images 601 appended to data structure 300.

As an illustrative example, for each operation of operations 603, communication subsystem 112 may receive data (e.g., feature 606, feature 609, feature 612, or other features) associated with the operation. For example, the operation may be a transaction made at a bicycle store. Embedding subsystem 116 may generate a token embedding based on the data associated with the operation and may provide the token embedding to a stochastic machine learning model to obtain an image related to the operation. The image may depict a bicycle or may incorporate other data associated with the transaction. In some embodiments, authentication subsystem 118 may generate, using the image, an item deep-linked to application functionality for submitting feedback relating to the operation. Communication subsystem 112 may then display the image or deep-linked item with the operation and operation data. For example, communication subsystem 112 may display the image depicting the bicycle along with the operation detailing the transaction at the bicycle shop. In some embodiments, communication subsystem 112 may display all of operations 603 or a subset of operations 603 with the corresponding images, as shown in FIG. 6. For example, communication subsystem 112 may display all operations 603 that occurred within the past day, week, month, or other time period along with the corresponding images. The user may review operations 603 to verify that the events are valid (e.g., one or more operations were authorized by an authorized user of the token). Communication subsystem 112 may receive feedback relating to the bicycle image indicating that the corresponding operation is invalid. For example, communication subsystem 112 may display a prompt indicating that the user should click on any images that appear invalid, and communication subsystem 112 may receive a selection of the bicycle image from the user. The feedback may be indicative of malicious activity relating to the corresponding operation. Authentication subsystem 118 may thus take a remedial action related to the token or to the event. For example, authentication subsystem 118 may disable use of the token (e.g., VCN) used in connection with the bicycle store purchase.

Returning to FIG. 1, communication subsystem 112 may receive event data associated with an event performed in connection with a token and embedding subsystem 116 may generate a token embedding based on the event data. Machine learning subsystem 114 may provide the token embedding to a stochastic machine learning model to obtain an image related to the event. Communication subsystem 112 may generate, for display, the image and the event data. In some embodiments, each image may be deep-linked to functionality for submitting feedback relating to the events. Communication subsystem 112 may receive feedback related to the image. For example, the feedback may be received via feedback functionality of a deep-linked item corresponding to an operation or event. Communication subsystem 112 may receive a selection of or interaction with the deep-linked item. When the deep-linked item is clicked or the deep link is activated, communication subsystem 112 may use information in the link to determine where to route the user. For example, communication subsystem 112 may generate for display application functionality for submitting feedback. In some embodiments, this may involve launching an application or browser on a user device to display the application functionality.

In some embodiments, the feedback may include negative feedback. For example, negative feedback may indicate an invalid event. In some embodiments, the feedback may include the user selecting, typing, or speaking the feedback. In some embodiments, the feedback may include a selection of a button, icon, or image. For example, the feedback may convey that an operation is fraudulent, invalid, or suspicious or that the user did not perform the operation. In some embodiments, the feedback may include positive feedback. For example, negative feedback may indicate a valid event. For example, communication subsystem 112 may prompt the user to submit feedback relating to a suspicious operation. A suspicious operation may be an operation that is unexpected (e.g., due to location, time, operation history of the user, etc.) for the user. Communication subsystem 112 may receive feedback indicating that the user did perform the operation. In some embodiments, the feedback may include other information or additional information.

In some embodiments, authentication subsystem 118 may perform, based on the feedback related to the image, a remedial action related to the token or to the operation. For example, a remedial action may include disabling use of the token. Disabling use of the token may involve preventing the token from being used for authentication and access to network resources. The token may be marked as invalid or revoked so that future attempts to use the token for authentication will fail. Future attempts to use the disabled token for accessing network resources, APIs, or services may be denied. The system may recognize the disabled status of the token and prevent any further actions associated with it. In some embodiments, the disabled token may be stored in a list of revoked or disabled tokens, which may be checked during each authentication attempt to ensure that no revoked tokens are being used. In some embodiments, authentication subsystem 118 may temporarily disable use of the token. In some embodiments, a remedial action may include retroactively cancelling the operation or event performed in connection with the token that was marked as invalid. In some embodiments, cancelling the operation may involve reversing a transaction (e.g., issuing a refund). In some embodiments, a remedial action may include instituting additional security measures for the token. Additional security measures may include bolstering system security, issuing new authentication credentials, or otherwise increasing the difficulty of accessing the token fraudulently. In some embodiments, other remedial actions may be taken.

Computing Environment

Figure 7:
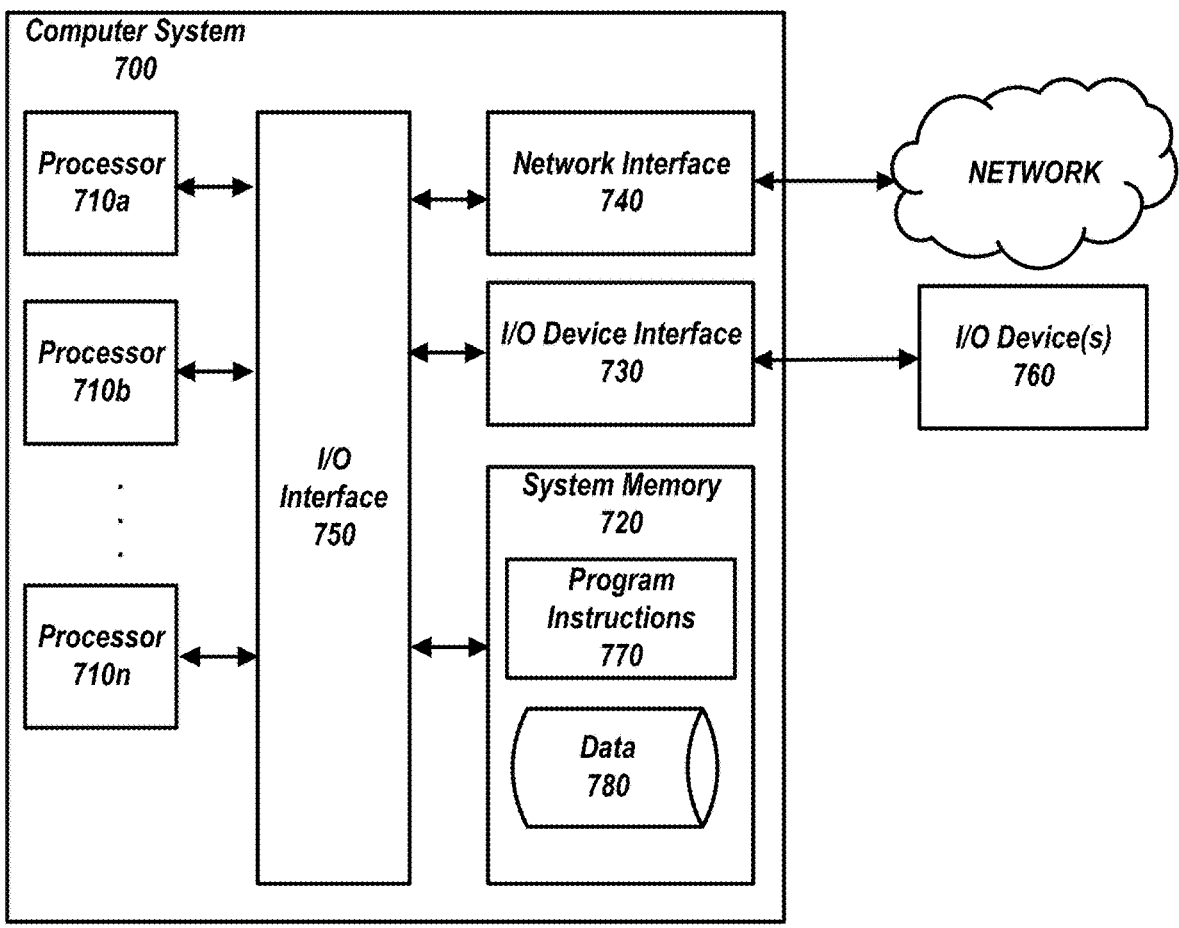
FIG. 7 illustrates a computing device, in accordance with one or more embodiments.

FIG. 7 shows an example computing system 700 that may be used in accordance with some embodiments of this disclosure. A person skilled in the art would understand that those terms may be used interchangeably. The components of FIG. 7 may be used to perform some or all operations discussed in relation to FIGS. 1-6. Furthermore, various portions of the systems and methods described herein may include or be executed on one or more computer systems similar to computing system 700. Further, processes and modules described herein may be executed by one or more processing systems similar to that of computing system 700.

Computing system 700 may include one or more processors (e.g., processors 710a-710n) coupled to system memory 720, an input/output (I/O) device interface 730, and a network interface 740 via an I/O interface 750. A processor may include a single processor, or a plurality of processors (e.g., distributed processors). A processor may be any suitable processor capable of executing or otherwise performing instructions. A processor may include a central processing unit (CPU) that carries out program instructions to perform the arithmetical, logical, and I/O operations of computing system 700. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 720). Computing system 700 may be a uni-processor system including one processor (e.g., processor 710a), or a multi-processor system including any number of suitable processors (e.g., 710a-710n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, for example, an FPGA (field-programmable gate array) or an ASIC (application-specific integrated circuit). Computing system 700 may include a plurality of computing devices (e.g., distributed computer systems) to implement various processing functions.

I/O device interface 730 may provide an interface for connection of one or more I/O devices 760 to computing system 700. I/O devices may include devices that receive input (e.g., from a user) or output information (e.g., to a user). I/O devices 760 may include, for example, a graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 760 may be connected to computing system 700 through a wired or wireless connection. I/O devices 760 may be connected to computing system 700 from a remote location. I/O devices 760 located on remote computer systems, for example, may be connected to computing system 700 via a network and network interface 740.

Network interface 740 may include a network adapter that provides for connection of computing system 700 to a network. Network interface 740 may facilitate data exchange between computing system 700 and other devices connected to the network. Network interface 740 may support wired or wireless communication. The network may include an electronic communication network, such as the Internet, a local area network (LAN), a wide area network (WAN), a cellular communications network, or the like.

System memory 720 may be configured to store program instructions 770 or data 780. Program instructions 770 may be executable by a processor (e.g., one or more of processors 710a-710n) to implement one or more embodiments of the present techniques. Program instructions 770 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program may be deployed to be executed on one or more computer processors located locally at one site or distributed across multiple remote sites and interconnected by a communication network.

System memory 720 may include a tangible program carrier having program instructions stored thereon. A tangible program carrier may include a non-transitory computer-readable storage medium. A non-transitory computer-readable storage medium may include a machine-readable storage device, a machine-readable storage substrate, a memory device, or any combination thereof. A non-transitory computer-readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard drives), or the like. System memory 720 may include a non-transitory computer-readable storage medium that may have program instructions stored thereon that are executable by a computer processor (e.g., one or more of processors 710a-710n) to cause the subject matter and the functional operations described herein. A memory (e.g., system memory 720) may include a single memory device and/or a plurality of memory devices (e.g., distributed memory devices).

I/O interface 750 may be configured to coordinate I/O traffic between processors 710a-710n, system memory 720, network interface 740, I/O devices 760, and/or other peripheral devices. I/O interface 750 may perform protocol, timing, or other data transformations to convert data signals from one component (e.g., system memory 720) into a format suitable for use by another component (e.g., processors 710a-710n). I/O interface 750 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computing system 700, or multiple computer systems 700 configured to host different portions or instances of embodiments. Multiple computer systems 700 may provide for parallel or sequential processing/execution of one or more portions of the techniques described herein.

Those skilled in the art will appreciate that computing system 700 is merely illustrative and is not intended to limit the scope of the techniques described herein. Computing system 700 may include any combination of devices or software that may perform or otherwise provide for the performance of the techniques described herein. For example, computing system 700 may include or be a combination of a cloud-computing system, a data center, a server rack, a server, a virtual server, a desktop computer, a laptop computer, a tablet computer, a server device, a user device, a mobile telephone, a personal digital assistant (PDA), a mobile audio or video player, a game console, a vehiclemounted computer, a Global Positioning System (GPS), or the like. Computing system 700 may also be connected to other devices that are not illustrated or may operate as a stand-alone system. In addition, the functionality provided by the illustrated components may, in some embodiments, be combined in fewer components, or distributed in additional components. Similarly, in some embodiments, the functionality of some of the illustrated components may not be provided, or other additional functionality may be available.

Operation Flow

Figure 10:
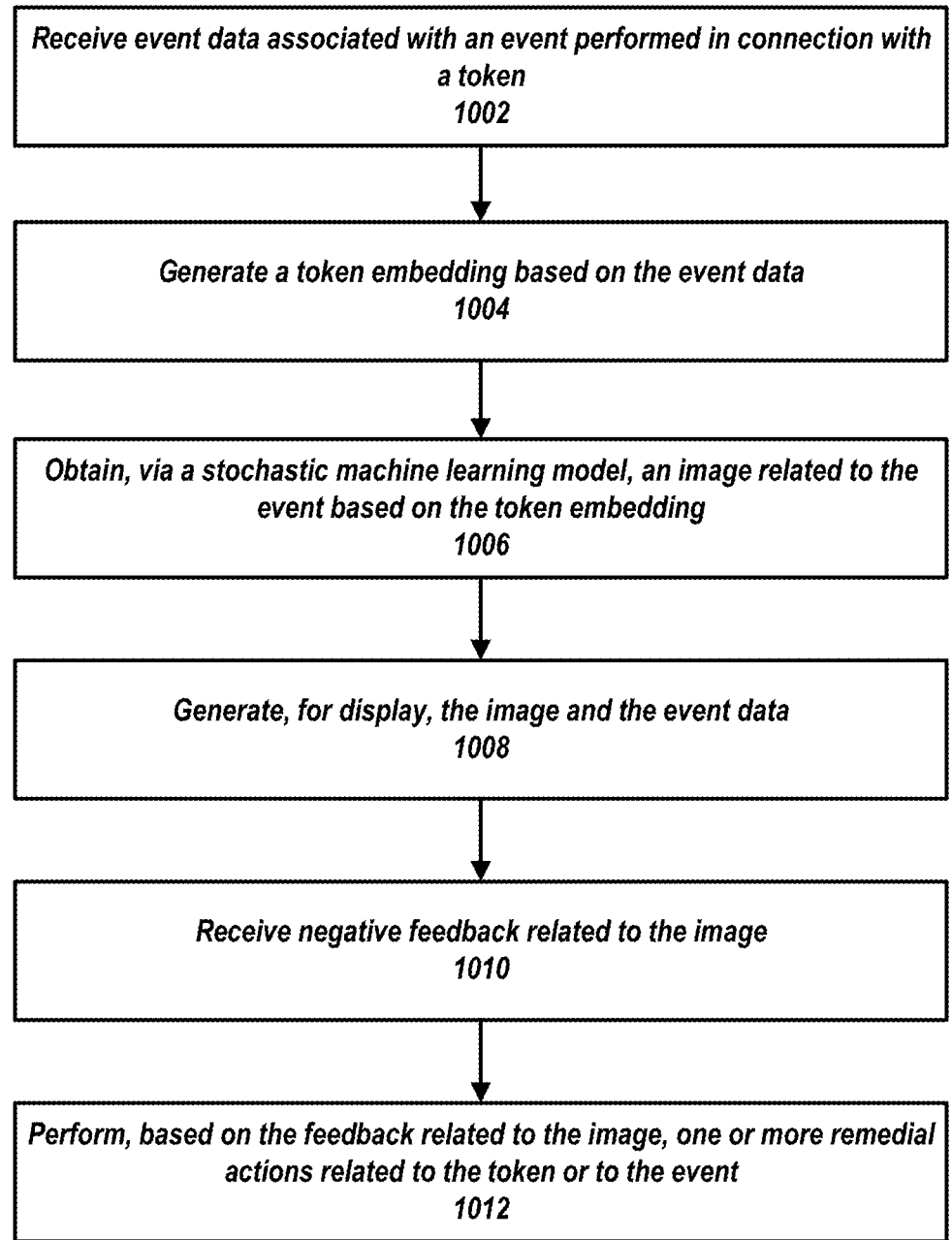
FIG. 10 shows a flowchart of the process for generating deep-linked items related to stochastic images derived from operation data, in accordance with one or more embodiments.

FIGS. 8-10 are example flowcharts of processing operations of methods that enable the various features and functionality of the system as described in detail above. The processing operations of each method presented below are intended to be illustrative and non-limiting. In some embodiments, for example, the methods may be accomplished with one or more additional operations not described, and/or without one or more of the operations discussed. Additionally, the order in which the processing operations of the methods are illustrated (and described below) is not intended to be limiting.

The methods may be implemented in one or more processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on an electronic storage medium. The processing devices may include one or more devices configured through hardware, firmware, and/or software to be specifically designed for execution of one or more of the operations of the methods.

FIG. 8 shows a flowchart of the process 800 for generating deep-linked stochastic image representations of access tokens, in accordance with one or more embodiments. For example, the system may use process 800 (e.g., as implemented on one or more system components described above) to generate deep-linked images in connection with registration of access tokens with accounts.

At 802, system 102 (e.g., using one or more of processors 710a-710n) may obtain token data associated with an access token and event data associated with events performed with the access token. In some embodiments, system 102 may obtain this data in connection with a request to register an access token with an account. In some embodiments, the registration request may include a token identifier associated with the access token. System 102 may use the token identifier to retrieve the token data and the event data. System 102 may obtain the data using one or more of processors 710a-710n and may obtain the data from system memory 720 or data 780.

At 804, system 102 (e.g., using one or more of processors 710a-710n) may generate input vectors using the token data and the event data The input vectors may compile the token and event data for processing by a stochastic machine learning model. System 102 may generate the input vectors using one or more of processors 710a-710n.

At 806, system 102 (e.g., using one or more of processors 710a-710n) may obtain, via a stochastic machine learning model, an image for the token based on the input vectors. For example, system 102 may provide the input vectors to a stochastic machine learning model to obtain an image for the token. System 102 may obtain the image using one or more of processors 710a-710n.

At 808, system 102 (e.g., using one or more of processors 710a-710n) may generate, for display, an image representation of the access token. For example, the image representation may include the image and a deep link to functionality associated with the access token. In some embodiments, the functionality may include functionality for transmitting the token or other functionality. System 102 may generate the image representation of the access token using one or more of processors 710a-710n.

FIG. 9 shows a flowchart of the process 900 for facilitating token use authentication for an access token using stochastic-model-derived images, in accordance with one or more embodiments. For example, the system may use process 900 (e.g., as implemented on one or more system components described above) to generate an authentication image set for authenticating token use by a user.

At 902, system 102 (e.g., using one or more of processors 710a-710n) may detect an authentication request to authenticate use of an access token. For example, a user may be attempting to gain access to a system using the access token. In some embodiments, the access token may be associated with a first image previously displayed to an authenticated user of the access token. For example, the first image may have been displayed to the authenticated user in connection with a prior event, such as when the access token was previously used to grant access to a system. System 102 may detect the authentication request using one or more of processors 710a-710n or via I/O devices 760.

At 904, system 102 (e.g., using one or more of processors 710a-710n) may retrieve a first image, such as the first image previously displayed to the authenticated user of the access token, and input parameters previously used to generate the first image. The input parameters may correspond to token data associated with the access token. System 102 may retrieve the first image and the input parameters from system memory 720.

At 906, system 102 (e.g., using one or more of processors 710a-710n) may obtain, via a stochastic machine learning model, a second image different from the first image based on the input parameters. For example, the system may provide the input parameters to a stochastic machine learning model to obtain a second image different from the first image. System 102 may obtain the second image using one or more of processors 710a-710n.

At 908, system 102 (e.g., using one or more of processors 710a-710n) may generate, for display, an image set. In some embodiments, the image set may include the first image and the second image. System 102 may generate the image set for display via I/O device interface 730 or I/O device 760.

At 910, system 102 (e.g., using one or more of processors 710a-710n) may receive a selection of the first image from the image set. For example, the user may select the first image in response to a prompt to select an image that was previously displayed to the user. System 102 may receive the selection via I/O device interface 730 or I/O device 760.

At 912, system 102 (e.g., using one or more of processors 710a-710n) may grant the authentication request based on the selection of the first image. In some embodiments, granting the authentication request may involve granting the user a session token or access token for the system. This token may serve as proof of authentication and authorization and may be used to access a requested account or resource during the current session. System 102 may grant the authentication request using one or more of processors 710a-710n.

FIG. 10 shows a flowchart of the process 1000 for generating deep-linked items related to stochastic images derived from operation data, in accordance with one or more embodiments. For example, the system may use process 1000 (e.g., as implemented on one or more system components described above) to generate items deep-linked to functionality for submitting feedback related to the operation data.

At 1002, system 102 (e.g., using one or more of processors 710a-710n) may receive or retrieve event data associated with an event performed in connection with a token. For example, the event data may include records of access granted or denied using the token. System 102 may receive or retrieve the event data from system memory 720 or data 780.

At 1004, system 102 (e.g., using one or more of processors 710a-710n) may generate a token embedding based on the event data. The token embedding may compile the event data for processing by a machine learning model. System 102 may generate the token embedding using one or more of processors 710a-710n.

At 1006, system 102 (e.g., using one or more of processors 710a-710n) may obtain, via a stochastic machine learning model, an image related to the event based on the token embedding. For example, system 102 may provide, to the stochastic machine learning model, the token embedding to cause the stochastic machine learning model to generate the image related to the event. System 102 may obtain the image using one or more of processors 710a-710n.

At 1008, system 102 (e.g., using one or more of processors 710a-710n) may generate, for display, the image and the event data. System 102 may generate the image and the event data for display via I/O device interface 730 or I/O device 760.

At 1010, system 102 (e.g., using one or more of processors 710a-710n) may receive negative feedback related to the image. For example, the negative feedback may be indicative of an invalid event. In some embodiments, the negative feedback may be indicative of malicious activity. System 102 may receive the feedback via I/O device interface 730 or I/O device 760.

At 1012, system 102 (e.g., using one or more of processors 710a-710n) may perform, based on the feedback related to the image, one or more remedial actions related to the token or to the event. In some embodiments, a remedial action may include disabling use of the token, retroactively cancelling the event, or performing another remedial action. System 102 may perform the remedial actions using one or more of processors 710a-710n.

It is contemplated that the steps or descriptions of FIGS. 8-10 may be used with any other embodiment of this disclosure. In addition, the steps and descriptions described in relation to FIGS. 8-10 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIGS. 8-10.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

This patent application is one of a set of patent applications filed on the same day by the same applicant. These patent applications have the following titles: GENERATING DEEP-LINKED STOCHASTIC IMAGES (U.S. patent application Ser. No. 18/506,834), FACILITATING TOKEN USE AUTHENTICATION FOR AN ACCESS TOKEN USING STOCHASTIC IMAGES (U.S. patent application Ser. No. 18/506,879), and IDENTIFYING MALICIOUS ACTIVITY USING DEEP-LINKED ITEMS RELATED TO STOCHASTIC IMAGES (U.S. patent application Ser. No. 18/506,912). The entire contents of each of the foregoing other patent applications are hereby incorporated by reference.

The present techniques will be better understood with reference to the following enumerated embodiments:

1. A method comprising, in connection with a request to register an token with an account, obtaining (i) token data associated with the token and (ii) event data associated with one or more events performed with the token or to be performed with the token, generating, for input to a stochastic machine learning model, one or more input vectors using the token data and the event data, obtaining, via a stochastic machine learning model, an image for the token based on the one or more input vectors, and generating, for display on a user interface associated with the account, an image representation of the token comprising the image and a link to functionality associated with the token.

2. The method of any one of the preceding embodiments, further comprising retrieving, from the request to register the token with the account, a token identifier associated with the token determining, using the token identifier, one or more constraints for outputs from the stochastic machine learning model based on a plurality of training input vectors, and training, using the one or more constraints and the plurality of training input vectors, the stochastic machine learning model to generate images for tokens in accordance with the one or more constraints.

3. The method of any one of the preceding embodiments, wherein training the stochastic machine learning model to generate the images for the tokens in accordance with the one or more constraints comprises inputting, into a training routine of the stochastic machine learning model, the one or more constraints to train the stochastic machine learning model to generate images for tokens in accordance with the one or more constraints, determining, using a loss function, a discrepancy between the images generated by the stochastic machine learning model and the one or more constraints, and updating the stochastic machine learning model based on the discrepancy.

4. The method of any one of the preceding embodiments, wherein determining the one or more constraints comprises retrieving, using the token identifier, one or more preferences from the account, and determining the one or more constraints based on the one or more preferences from the account.

5. The method of any one of the preceding embodiments, further comprising registering the token with the account, wherein generating the image representation of the token is performed in response to registration of the token with the account.

6. The method of any one of the preceding embodiments, wherein generating the image representation of the token comprises generating, for display on the account, a deep-linked image comprising the deep link embedded in the image to application functionality for transmitting the token.

7. The method of any one of the preceding embodiments, further comprising retrieving, from an external database, source data relating to one or more sources of the one or more events, and generating the one or more input vectors using the token data, the event data, and the source data.

8. The method of any one of the preceding embodiments, further comprising determining a subset of the one or more events performed with the token or to be performed with the token, the subset of the one or more events relating to a first category, and determining aggregated resources associated with the subset of the one or more events within a time frame.

9. The method of any one of the preceding embodiments, further comprising retrieving, from the request to register the token with the account, a token identifier associated with the token, and retrieving, using the token identifier, one or more preferences from the account, the one or more preferences relating to the first category.

10. The method of any one of the preceding embodiments, further comprising generating the one or more input vectors using the token data, the event data, the aggregated resources, and the one or more preferences.

11. A method comprising detecting an authentication request to authenticate use of an token, the token being associated with a first image previously displayed to an authenticated user of the token, retrieving, from storage, (i) the first image previously displayed to the authenticated user and (ii) one or more input parameters previously used to generate the first image, the one or more input parameters corresponding to token data associated with the token, obtaining, via a stochastic machine learning model a second image, different from the first image, based on the one or more input parameters, generating, for display, an image set comprising the first image and the second image, receiving a selection of the first image from the image set, and granting the authentication request based on the selection of the first image.

12. The method of any one of the preceding embodiments, further comprising generating, for display with the image set, instructions to select an image that has been previously displayed to the authenticated user.

13. The method of any one of the preceding embodiments, further comprising declining the authentication request based on the selection of the second image.

14. The method of any one of the preceding embodiments, further comprising retrieving, from storage, a first image representation of the first image, wherein the first image representation has been previously transmitted to the authenticated user, and generating, for display, instructions to input an image representation corresponding to a selected image of the image set.

15. The method of any one of the preceding embodiments, further comprising receiving a candidate image representation corresponding to the selection of the first image from the image set, and comparing the candidate image representation and the first image representation, wherein the authentication request is granted based on determining a match between the candidate image representation and the first image representation.

16. The method of any one of the preceding embodiments, further comprising requesting, from the authenticated user, a secret associated with the authenticated user.

17. The method of any one of the preceding embodiments, further comprising generating, using the secret, an image layer, and applying the image layer to the first image to generate a first authentication image, wherein granting the authentication request based on the selection of the first image further comprises determining that the first authentication image comprises a hidden image that is unique to the authenticated user.

18. The method of any one of the preceding embodiments, further comprising receiving, from the authenticated user, the secret, generating an input comprising the first image and the secret, and providing the input to a machine learning model trained to generate authentication images based on images and secrets, wherein providing the input to the machine learning model causes the machine learning model to generate a first authentication image.

19. The method of any one of the preceding embodiments, wherein granting the authentication request based on the selection of the first image further comprises determining that the first authentication image comprises a hidden image that is unique to the authenticated user.

20. The method of any one of the preceding embodiments, further comprising declining the authentication request based on determining that the first authentication image does not comprise a hidden image that is unique to the authenticated user.

21. A method comprising detecting an authentication request to authenticate use of a token, the token being associated with a first image previously displayed to an authenticated user of the token, retrieving, from storage, a stored representation of at least a portion of the first image previously displayed to the authenticated user, the first image being previously generated via a stochastic machine learning model using token data associated with the token as input parameters to the stochastic machine learning model, receiving an image representation related to the token in connection with the authentication request, and generating an authentication response to the authentication request based on (i) the stored representation of at least the portion of the first image and (ii) the image representation of the authentication request.

22. The method of any one of the preceding embodiments, further comprising comparing the stored representation and the image representation to determine whether the image representation matches the stored representation.

23. The method of any one of the preceding embodiments, wherein comparing the stored representation and the image representation comprises generating an input comprising the image representation and a secret associated with the authenticated user, and providing the input to a machine learning model trained to generate authentication representations based on representations and secrets, wherein providing the input to the machine learning model causes the machine learning model to generate an authentication representation.

24. The method of any one of the preceding embodiments, further comprising generating, using the secret associated with the authenticated user, an image layer, and applying the image layer to the first image to generate a first authentication image, wherein generating the authentication response to the authentication request comprises granting the authentication request in response to determining that the first authentication image comprises a hidden image that is unique to the authenticated user.

25. The method of any one of the preceding embodiments, wherein generating the authentication response to the authentication request comprises granting the authentication request in response to determining that the authentication representation comprises a hidden representation that is unique to the authenticated use.

26. The method of any one of the preceding embodiments, wherein generating the authentication response to the authentication request comprises declining the authentication request in response to determining that the authentication representation does not comprise a hidden representation that is unique to the authenticated user.

27. The method of any one of the preceding embodiments, wherein generating the authentication response to the authentication request comprises comparing the stored representation and the image representation, and granting the authentication request in response to determining that the image representation matches the stored representation.

28. The method of any one of the preceding embodiments, wherein generating the authentication response to the authentication request comprises comparing the stored representation and the image representation, and declining the authentication request in response to determining that the image representation does not match the stored representation.

29. The method of any one of the preceding embodiments, further comprising providing the input parameters to the stochastic machine learning model to obtain a second image different from the first image, generating, for display, an image set comprising the first image and the second image, and receiving a selection of the first image from the image set, wherein receiving the image representation comprises receiving, in connection with the selection of the first image, the image representation of the first image.

30. A method comprising receiving event data associated with an event performed in connection with a token, generating a token embedding based on the event data, obtaining, via a stochastic machine learning model, an image related to the event based on the token embedding, generating, for display, the image and the event data, receiving feedback related to the image indicating an invalid event, and performing, based on the feedback related to the image, one or more remedial actions related to the token or to the event.

31. The method of any one of the preceding embodiments, wherein obtaining, via the stochastic machine learning model, the image related to the event based on the token embedding comprises providing the token embedding to the stochastic machine learning model to obtain the image related to the event.

32. The method of any one of the preceding embodiments, further comprising generating, for display, in connection with the image and the event data, a deep-linked item related to (i) the image and (ii) the event data, the deep-linked item comprising a deep link to functionality for transmitting feedback related to use of the token for the event.

33. The method of any one of the preceding embodiments, wherein receiving the feedback comprises receiving, via the deep-linked item, negative feedback for the event.

34. The method of any one of the preceding embodiments, wherein the deep-linked item is generated for display at a time associated with the event.

35. The method of any one of the preceding embodiments, wherein performing the one or more remedial actions comprises disabling use of the token.

36. The method of any one of the preceding embodiments, wherein performing the one or more remedial actions comprises retroactively cancelling the event performed in connection with the token.

37. The method of any one of the preceding embodiments, further comprising generating, for display, a plurality of events, wherein the plurality of events comprises the event, generating, for display, in connection with the plurality of events, a plurality of images corresponding to the plurality of events, wherein the plurality of images comprises the image, and receiving one or more instances of feedback related to one or more images of the plurality of images indicating one or more invalid events of the plurality of events.

38. The method of any one of the preceding embodiments, wherein the plurality of events comprises events occurring within a time period, and wherein the plurality of events and the plurality of images are generated for display at a conclusion of the time period.

39. The method of any one of the preceding embodiments, further comprising retrieving a token identifier associated with the token, determining, using the token identifier, one or more constraints for outputs from the stochastic machine learning model based on a plurality of training input embeddings, and training, using the one or more constraints and the plurality of training input embeddings, the stochastic machine learning model to generate images for tokens in accordance with the one or more constraints.

40. The method of any one of the preceding embodiments, wherein training the stochastic machine learning model to generate the images for the tokens in accordance with the one or more constraints comprises inputting, into a training routine of the stochastic machine learning model, the one or more constraints to train the stochastic machine learning model to generate images for tokens in accordance with the one or more constraints, determining, using a loss function, a discrepancy between the images generated by the stochastic machine learning model and the one or more constraints, and updating the stochastic machine learning model based on the discrepancy.

41. One or more tangible, non-transitory, machine-readable media storing instructions that, when executed by one or more data processing apparatuses, cause operations comprising those of any of embodiments 1-40.

42. A system comprising one or more processors; and memory storing instructions that, when executed by the processors, cause the processors to effectuate operations comprising those of any of embodiments 1-40.

43. A system comprising means for performing any of embodiments 1-40.

44. A system comprising cloud-based circuitry for performing any of embodiments 1-40.

What is claimed is:

1. A system for generating a deep-linked stochastic image representation of an access token that embeds a token access deep link on a mobile application interface, the system comprising:

one or more processors and one or more non-transitory computer-readable media having computer-executable instructions stored thereon, the computer-executable instructions, when executed by the one or more processors, causing operations comprising:

receiving a registration request to register a network access token with a mobile application, wherein the registration request comprises a token identifier associated with the network access token;

in response to receiving the registration request, retrieving, using the token identifier, operation data associated with network operations performed with the network access token;

generating, for input to a stochastic machine learning model, a token embedding using (i) the token identifier associated with the network access token and (ii) the operation data associated with the network operations performed with the network access token;

providing the token embedding to the stochastic machine learning model to obtain a stochastic image for the network access token; and in response to registration of the network access token with the mobile application, generating, for display on the mobile application, a deep-linked stochastic image comprising a deep link embedded in the stochastic image to application functionality for transmitting the network access token.

2. A method comprising:

in connection with a request to register an access token with an account, obtaining (i) token data associated with the access token and (ii) event data associated with one or more events performed with the access token or to be performed with the access token;

generating, for input to a stochastic machine learning model, one or more input vectors using the token data and the event data;

providing the one or more input vectors to the stochastic machine learning model to obtain an image for the access token; and generating, for display on a user interface associated with the account, an image representation of the access token comprising the image and a deep link to functionality associated with the access token.

3. The method of claim 2, further comprising:

retrieving, from the request to register the access token with the account, a token identifier associated with the access token;

determining, using the token identifier, one or more constraints for outputs from the stochastic machine learning model based on a plurality of training input vectors; and training, using the one or more constraints and the plurality of training input vectors, the stochastic machine learning model to generate images for access tokens in accordance with the one or more constraints.

4. The method of claim 3, wherein training the stochastic machine learning model to generate the images for the access tokens in accordance with the one or more constraints comprises:

inputting, into a training routine of the stochastic machine learning model, the one or more constraints to train the stochastic machine learning model to generate images for access tokens in accordance with the one or more constraints;

determining, using a loss function, a discrepancy between the images generated by the stochastic machine learning model and the one or more constraints; and updating the stochastic machine learning model based on the discrepancy.

5. The method of claim 3, wherein determining the one or more constraints comprises:

retrieving, using the token identifier, one or more preferences from the account; and determining the one or more constraints based on the one or more preferences from the account.

6. The method of claim 2, further comprising registering the access token with the account, wherein generating the image representation of the access token is performed in response to registration of the access token with the account.

7. The method of claim 2, wherein generating the image representation of the access token comprises generating, for display on the account, a deep-linked image comprising the deep link embedded in the image to application functionality for transmitting the access token.

8. The method of claim 2, further comprising:

retrieving, from an external database, source data relating to one or more sources of the one or more events; and generating the one or more input vectors using the token data, the event data, and the source data.

9. The method of claim 2, further comprising:

determining a subset of the one or more events performed with the access token or to be performed with the access token, the subset of the one or more events relating to a first category; and determining aggregated resources associated with the subset of the one or more events within a time frame.

10. The method of claim 9, further comprising:

retrieving, from the request to register the access token with the account, a token identifier associated with the access token; and retrieving, using the token identifier, one or more preferences from the account, the one or more preferences relating to the first category.

11. The method of claim 10, further comprising generating the one or more input vectors using the token data, the event data, the aggregated resources, and the one or more preferences.

12. One or more non-transitory, computer-readable media storing instructions that when executed by one or more processors cause the one or more processors to perform operations comprising:

obtaining, based on a request related to a token associated with a user, (i) token data associated with the token and (ii) event data associated with one or more events related to the token;

determining a subset of the one or more events performed with the token or to be performed with the token, the subset of the one or more events relating to a first category;

determining aggregated resources associated with the subset of the one or more events within a time frame;

generating one or more input vectors using the token data and the event data;

obtaining, via a stochastic machine learning model, an image for the token based on the one or more input vectors; and generating, for display on a user interface associated with the user, an image representation of the token, the image representation of the token being displayed in connection with use of the token for at least one event.

13. The one or more non-transitory, computer-readable media of claim 12, wherein the instructions further cause the one or more processors to perform operations comprising:

retrieving, from the request, a token identifier associated with the token;

determining, using the token identifier, one or more constraints for outputs from the stochastic machine learning model based on a plurality of training input vectors; and training, using the one or more constraints and the plurality of training input vectors, the stochastic machine learning model to generate images for tokens in accordance with the one or more constraints.

14. The one or more non-transitory, computer-readable media of claim 13, wherein training the stochastic machine learning model to generate the images for the tokens in accordance with the one or more constraints comprises:

inputting, into a training routine of the stochastic machine learning model, the one or more constraints to train the stochastic machine learning model to generate images for tokens in accordance with the one or more constraints;

determining, using a loss function, a discrepancy between the images generated by the stochastic machine learning model and the one or more constraints; and updating the stochastic machine learning model based on the discrepancy.

15. The one or more non-transitory, computer-readable media of claim 13, wherein determining the one or more constraints comprises:

retrieving, using the token identifier, one or more preferences associated with the user; and determining the one or more constraints based on the one or more preferences.

16. The one or more non-transitory, computer-readable media of claim 12, wherein the instructions further cause the one or more processors to perform operations comprising registering the token with an account associated with the user, wherein generating the image representation of the token is performed in response to registration of the token with the account.

17. The one or more non-transitory, computer-readable media of claim 12, wherein generating the image representation of the token comprises generating for display the image representation of the token comprising the image and a deep link to functionality associated with the token.

18. The one or more non-transitory, computer-readable media of claim 12, wherein the instructions further cause the one or more processors to perform operations comprising:

retrieving, from an external database, source data relating to one or more sources of the one or more events; and generating the one or more input vectors using the token data, the event data, and the source data.

19. The one or more non-transitory, computer-readable media of claim 12, wherein the instructions further cause the one or more processors to perform operations comprising:

retrieving, from the request, a token identifier associated with the token;

retrieving, using the token identifier, one or more preferences associated with the user, the one or more preferences relating to the first category; and generating the one or more input vectors using the token data, the event data, the aggregated resources, and the one or more preferences.

* * * * *